(12) United States Patent
Chukka et al.

(10) Patent No.: US 11,657,503 B2
(45) Date of Patent: May 23, 2023

(54) COMPUTER SCORING BASED ON PRIMARY STAIN AND IMMUNOHISTOCHEMISTRY IMAGES RELATED APPLICATION DATA

(71) Applicant: Ventana Medical Systems, Inc., Tucson, AZ (US)

(72) Inventors: Srinivas Chukka, San Jose, CA (US); Kien Nguyen, Ho Chi Minh (VN); Ting Chen, Sunnyvale, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 273 days.

(21) Appl. No.: 17/202,546

(22) Filed: Mar. 16, 2021

(65) Prior Publication Data

US 2021/0201485 A1    Jul. 1, 2021

Related U.S. Application Data

(63) Continuation of application No. 16/448,826, filed on Jun. 21, 2019, now Pat. No. 10,977,791, which is a
(Continued)

(51) Int. Cl.
*G06T 7/00* (2017.01)
*G06V 20/69* (2022.01)

(52) U.S. Cl.
CPC .......... *G06T 7/0012* (2013.01); *G06V 20/695* (2022.01); *G06V 20/698* (2022.01); *G06T 2207/30024* (2013.01)

(58) Field of Classification Search
CPC ........ G06T 7/0012; G06T 2207/30024; G06K 9/0014; G06K 9/00147
See application file for complete search history.

(56) References Cited

U.S. PATENT DOCUMENTS 5,650,327 A    7/1997   Copeland et al.
5,654,200 A    8/1997   Copeland et al.
(Continued)

FOREIGN PATENT DOCUMENTS

CN    105027165 A    11/2015
WO    2011049608 A2    4/2011
(Continued)

OTHER PUBLICATIONS

Application No. JP2021-174267, Office Action, dated Sep. 1, 2022, 5 pages (English translation pp. 1-3, original document pp. 4-5).
(Continued)

*Primary Examiner* — Mark Roz
(74) *Attorney, Agent, or Firm* — Kilpatrick Townsend & Stockton LLP

(57) ABSTRACT

Described herein are computer-implemented methods for analysis of a tissue sample. An example method includes: annotating the whole tumor regions or set of tumorous sub-regions either on a biomarker image or an H&E image (e.g. from an adjacent serial section of the biomarker image); registering at least a portion of the biomarker image to the H&E image; detecting different cellular and regional tissue structures within the registered H&E image; computing a probability map based on the different detected structures within the registered H&E image; deriving nuclear metrics from each of the biomarker and H&E images; deriving probability metrics from the probability map; and classifying tumor nuclei in the biomarker image based on the computed nuclear and probability metrics.

14 Claims, 10 Drawing Sheets

Related U.S. Application Data continuation of application No. PCT/EP2017/083702, filed on Dec. 20, 2017.

(60) Provisional application No. 62/438,354, filed on Dec. 22, 2016.

(56) References Cited

U.S. PATENT DOCUMENTS

| | | | |
|---|---|---|---|
| 6,296,809 | B1 | 10/2001 | Richards et al. |
| 6,352,861 | B1 | 3/2002 | Copeland et al. |
| 6,827,901 | B2 | 12/2004 | Copeland et al. |
| 6,943,029 | B2 | 9/2005 | Copeland et al. |
| 10,977,791 | B2 | 4/2021 | Chukka et al. |
| 2003/0211630 | A1 | 11/2003 | Richards et al. |
| 2004/0052685 | A1 | 3/2004 | Richards et al. |
| 2008/0032328 | A1 | 2/2008 | Cline |
| 2011/0074944 | A1 | 3/2011 | Can |
| 2012/0226709 | A1 | 9/2012 | Bhargava et al. |
| 2013/0230230 | A1 | 9/2013 | Ajemba |

FOREIGN PATENT DOCUMENTS

| | | | |
|---|---|---|---|
| WO | 2014195193 | A1 | 12/2014 |
| WO | 2015049233 | A1 | 4/2015 |
| WO | 2015052128 | A1 | 4/2015 |
| WO | 2015113895 | A1 | 8/2015 |
| WO | 2015124772 | A1 | 8/2015 |
| WO | 2015124777 | A1 | 8/2015 |
| WO | 2015181371 | A1 | 12/2015 |
| WO | 2016075096 | A1 | 5/2016 |
| WO | 2016087592 | A1 | 6/2016 |
| WO | 2016120433 | A1 | 8/2016 |
| WO | 2016120442 | A1 | 8/2016 |

OTHER PUBLICATIONS

Bonnie Hall et al., "A Clinically Motivated 2-Fold Framework for Quantifying and Classifying Immunohistochemically Stained Specimens," Oct. 29, 2007 (Oct. 29, 2007), ECCV 2016 Conference; [Lecture Notes in Computer Science; Lect.Notes Computer], Springer International Publishing, Cham, pp. 287-294, XP047462168, ISSN: 0302-9743, ISBN: 978-3-642-33485-6, abstract.
International Search Report and Written Opinion dated Mar. 16, 2018 in connection with PCT/EP2017/083702 filed Dec. 20, 2017.
11th International Symposium on Biomedical Imaging, Institute of Electrical and Electronics Engineers, Apr. 29-May 2, 2014, all pages.
Gonzalez, et al., "Digital Image Processing", Third Edition, Chapter 10, p. 689.
U.S. Appl. No. 16/448,826, Notice of Allowance dated Dec. 9, 2020, 11 pages.
European Application No. 17826220.0, Office Action dated Apr. 29, 2022, 5 pages.
Japanese Application No. 2019-534350, Office Action dated Sep. 23, 2020, 7 pages (3 pages of Original Document and 4 pages of English Translation).
International Application No. PCT/EP2017/083702, International Preliminary Report on Patentability dated Jun. 25, 2019, 7 pages.
Witkin et al., Active contour models, International, Journal of Computer Vision, vol. 1, 1988, pp. 321-332.
S. Lazebnik et al. "Beyond Bags of Features: Spatial Pyramid Matching for Recognizing Natural Scene Categories," VPR '06 Proceedings of the 2006 IEEE Computer Society Conference on Computer Vision and Pattern Recognition—vol. 2, pp. 2169-2178, Jun. 17-22, 2006.
Ausubel, et al., *Current Protocols in Molecular Biology*, Greene Publishing Associates and Wiley-Intersciences 2003, 1008 pages.
Bankman. et al., *Handbook of Medical Imaging, Processing and Analysis*, Academic Press, 2000, 910 pages.

Bautista, et al., *Improving the Visualization and Detection of Tissue Folds in Whole Slide Images Through Color Enhancement*, Journal of Pathology Informatics, vol. 1, No. 25, 10 pages, Nov. 10, 2010.
Gonzalez, et al., *Digital Image Processing, 4th Edition, Global Edition*, Pearson, 2018, 1022 pages.
Gurcan, et al., *Histopathological Image Analysis: A Review*. Institute of Electrical and Electronics Engineers, Review s in Biomedical Engineering , vol. 2, 59 pages, Oct. 30, 2009.
Haralick, et al., *Textural Features for Image Classification*, Institute of Electrical and Electronics Engineers Transactions on Systems, Man and Cybernetics, vol. SMC-3, No. 6, pp. 610-621, Nov. 1973.
Jain, et al., *Unsupervised Texture Segmentation Using GaborFilters*, Institute of Electrical and Electronics Engineers International Conference on Systems, Man and Cybernetics, pp. 14-19, Nov. 1990.
Jones, et al., *Methods for High-Content, High-Throughput Image-Based Cell Screening*, Proceedings of Microscopic Image Analysis with Applications in Biology, Available Online at: www.broad.mitedu/~thouis/MIAABPoster.pdf, 8 pages, published in 2006.
Jones, et al., *Voroni-Based Segmentation of Cells on Image Manifolds, in CVBIA*, Lecture Notes in Computer Science, vol. 3765, 9 pages, published in 2005.
Kass, et al., *Snakes: Active Contour Models*, International, Journal of Computer Vision, vol. 1, pp. 321-332, Jan. 1988.
Kong, et al., *A Comprehensive Framework for Classification of Nucleiin Digital Microscopy Imaging: An Application to Diffuse Gliomas*, Proceedings in Institute of Electrical and Electronics Engineers International Symposium Biomedical Imaging, pp. 2128-2161, Mar. 30, 2011.
Kriete, et al., *Automated quantification of quantum-dot-labelled epidermal growth factor receptor internalization via multiscale image segmentation*, Journal of Microscopy, vol. 222, Pt Apr. 1, 2006, pp. 22-27.
Lafferty, et al., *Conditional Random Fields: Probabilistic Models for Segmenting and Labeling Sequence Data*, In International Conference on Machine Learning, pp. 282-289, Jun. 28, 2001.
Lawson, et al., *Solving Least Squares Problems*, PrenticeHall, Chapter 23, 6 pages, published in 1974.
Lazebnik, et al., *Beyond Bags of Features: Spatial Pyramid Matching for Recognizing Natural Scene Categories*, Institute of Electrical and Electronics Engineers, Computer Vision and Pattern Recognition, 8 pages. Sep. 20-27, 1999.
Lin, et al., *A Hybrid 3D Watershed Algorithm Incorporating Gradient Cues and Object Models for Automatic Segmentation of Nuclei in Confocal Image Stacks*, Cytometry Part A, The Journal of the International Society of Analytical Cytology, vol. 56, No. 1, pp. 23-36, Nov. 2003.
Mahamud, et al., *Segmentation of Multiple Salient Closed Contours from Real Images*, Institute of Electrical and Electronics Engineers Transactions on Pattern Analysis and Machine Intelligence, vol. 25, No. 4, 11 pages, Apr. 2003.
Malik, et al., *Textons, Contours and Regions: Cue Integration in Image Segmentation*, Institute of Electrical and Electronics Engineers International Conference on Computer Vision, 8 pages, Sep. 20-27, 1999.
Parvin, et al., *Iterative Voting for Inference of Structural Saliency and Characterization of Subcellular Events*, Institute of Electrical and Electronics Engineers Transactions on Image Processing, vol. 16, No. 3, pp. 615-623, Mar. 2007.
Roerdink, et al., *The Watershed Transform: Definitions, Algorithms and Parallelization Strategies*, Fundamenta Informaticae, vol. 41, No. 1-2, pp. 187-228, Apr. 2000.
Ruifrok, et al., *Quantification of Histochemical Staining by Color Deconvolution*, Analytical and Quantitative Cytology and Histology, vol. 23, No. 4, pp. 291-299, Feb. 13, 2001.
Sambrook, et al., *Molecular Cloning: A Laboratory Manual*, Second Edition, Cold Spring Harbor Laboratory Press, 30 pages, published in 1989.
Sethian, *Level Set Methods: Evolving Interfaces in Geometry, Fluid Mechanics, Computer Vision and Materials Sciences*, Cambridge University Press, 3 pages, published in 1996.
Varma, et al., *Classifying Images of Materials: Achieving Viewpoint and Illumination Independence*, European Conference on Computer Vision, vol. 2352, pp. 255-271, Apr. 29, 2002.

(56) References Cited

OTHER PUBLICATIONS

Veta, et al., *Automatic Nuclei Segmentation in H&E Stained Breast Cancer Histopathology Images*, Public Library of Science, vol. 8, No. 7, e70221, 12 pages, Jul. 2013.
Vincent, et al., *Watersheds in Digital Spaces: An Efficient Algorithm Based on Immersion Simulations*, Institute of Electrical and Electronics Engineers Transactions on Pattern Analysis and Machine Intelligence, vol. 13, No. 6, pp. 583-598, Jun. 1991.
Xing, et al., *Robust Nucleus/Cell Detection and Segmentation in Digital Pathology and Microscopy Images: A Comprehensive Review*, Institute of Electrical and Electronics Engineers Reviews in Biomedical Engineering, vol. 9, pp. 24-263, Jan. 2016.
Xing, et al., "*An Automatic Learning-Based Framework for Robust Nucleus Segmentation*", IEEE Transactions on Medical Imaging, Feb. 2016, vol. 35/No. 2, p. 550-566.
Zimmermann, *Spectral Imaging and Linear Un-mixing in Light Microscopy*, Advancement in Biochemical Engineering and Biotechnology, vol. 95, pp. 245-265, May 27, 2005.
European Application No. EP17826220.0 received an Office Action dated Feb. 2, 2021, 4 pages.
Japan Application No. JP 2019-534350 received an Office Action dated May 10, 2021, 7 pages.
Japan Application No. JP 2019-534350 received a Notice of Decision to Grant dated Sep. 27, 202, 3 pages.
Application No. CN201780078305.6 , Office Action, dated Dec. 5, 2022, 19 pages (pp. 1-10 English translation, pp. 11-19 original document).

FIG 3B

IHC Whole Slide Image

321. Pathologist annotates sub image regions on IHC whole slide for image analysis. The annotated region can be the whole tumor region in the tissue slide.

322. IHC Image Analysis: Detect Nuclei and computed image features for the detected nuclei.

323. For each detected cell, append H&E image features and IHC image features. From H&E probability may and detected nuclei blob masks, aggregate cell level H&E features.

324. IHC Nuclei Cell Classification & Scoring

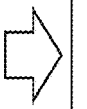

325. IHC Slide Scoring from Classified Nuclei

---

H&E Whole Slide Image of adjacent serial section

326. Inter-Marker Image registration. Mapping of regions annotated on IHC to H&E whole slide.
- Inter marker registration.
- Mapping of annotations from IHC image to the registered H&E image.

327. H&E Image Analysis:
- Image segmentation of tissue into Tumor, Lymphatic, stromal and necrotic regions.
- Nuclei Detection and Classification (Tumor Cells, Lymphocytes, stromal cells).

328. Generate Region probability map of different region types from segmentation and cell detection results. Region Probability map is the probability of a pixel in the region belonging to a particular class.

COMPUTER SCORING BASED ON PRIMARY STAIN AND IMMUNOHISTOCHEMISTRY IMAGES RELATED APPLICATION DATA

RELATED APPLICATION DATA

This is a continuation of U.S. patent application Ser. No. 16/448,826 filed Jun. 19, 2019, which is a continuation of International Patent Application No. PCT/EP2017/083702, filed Dec. 20, 2017, which claims the benefit and priority of U.S. Provisional Application Ser. No. 62/438,354, filed Dec. 22, 2016, all of which are incorporated herein by reference.

BACKGROUND

In the analysis of biological specimens, the specimens are often stained with one or more combinations of stains or assays, and the stained biological specimen is viewed or imaged for further analysis. Observing the assay enables a variety of processes, including diagnosis of disease, assessment of response to treatment, and development of new drugs to fight disease.

Immunohistochemical (IHC) slide staining can be utilized to identify proteins in cells of a tissue section and hence is widely used in the study of different types of cells, such as cancerous cells and immune cells in biological tissue. In the context of staining for immune cells, the immunological data indicates the type, density, and location of the immune cells within tumor samples and this data is of particular interest to pathologists in determining a patient survival prediction. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors.

In the traditional workflow for immunoscore computation, the expert reader selects the representative fields of view (FOVs) or regions of interest (ROIs) manually, as the initial step, by reviewing the slide under a microscope or reading an image of a slide, which has been scanned/digitized, on a display. When the tissue slide is scanned, the scanned image is viewed by independent readers and the FOVs or ROIs are manually marked based on the readers' personal preferences. After selecting the FOVs or ROIs, a pathologist/reader manually counts the immune cells within the selected FOVs or ROIs. Manual selection of the FOVs or ROIs and counting is highly subjective and biased to the readers, as different readers may select different FOVs or ROIs to count. Hence, an immunoscore study is not necessarily reproducible in a manual process.

BRIEF SUMMARY OF THE DISCLOSURE

In one aspect of the present disclosure is a computer-implemented method for analysis of a tissue sample comprising: receiving first and second input images, wherein one of the first or second input images corresponds to a biomarker image and wherein the other of the first or second input images corresponds to an H&E image; performing an analysis of the first image, including deriving features from the first image; registering at least a portion of the first image to the second image to form a registered image; performing an analysis of the registered image, including deriving features from the registered image; merging the features derived from the first image and features derived from the second image, wherein the features derived from one of the first image or the registered image include probability features; and classifying nuclei in the input image corresponding to the biomarker image based on the merged features set. In some embodiments, the biomarker image comprises signals corresponding to a presence of at least one of an estrogen receptor (ER) marker, a progesterone receptor (PR) marker, a Ki-67 marker, or a HER2 marker. In some embodiments, the biomarker image comprises signals corresponding to a presence of a PD-L1 marker, CD3 marker or CD8 marker. In some embodiments, the computer-implemented method further comprises the step of scoring the classified nuclei.

In one aspect of the present disclosure is a computer-implemented method for analysis of a tissue sample comprising: receiving first and second input images; performing an analysis of the first image, including deriving features from the first image; registering the first and second images by mapping at least a portion of the first image to the second image to form a registered image; performing an analysis of the registered image, including deriving features from the registered image; merging the features derived from the first image and features derived from the second image, wherein the features derived from one of the first image or the registered image include probability features; and classifying nuclei in one of the first or second images based on the merged features set. In some embodiments, the image in which the nuclei are classified is the image having signals corresponding to markers (e.g. a biomarker image). In some embodiments, the probability features are computed by (i) generating a probability map from one of the first image or the registered image; and (ii) deriving features from the generated probability map.

In some embodiments, the first image is an H&E image, the second image is a biomarker image, and wherein the probability features are derived from the first image. In some embodiments, a whole tumor region is mapped from the H&E image to the biomarker image to form the registered biomarker image. In some embodiments, the method further comprises the step of detecting nuclei in the registered image and wherein the features derived from the registered image are computed based on the detected nuclei. In some embodiments, the performing of the analysis of the first image comprises at least one (i) segmenting tissue structures within the first image; or (ii) detecting and classifying cell types within the first image. In some embodiments, the method further comprises the step of generating a probability map images based on the at least one of the segmented tissue structures or the detected and classified cell types. In some embodiments, the probability features are derived from the generated probability map images.

In some embodiments, the first image is a biomarker image, the second image is an H&E image, and the probability features are derived from the second image. In some embodiments, a region of the biomarker image is mapped to the H&E image to form the registered H&E image. In some embodiments, the performing of the analysis of the registered image comprises at least one (i) segmenting tissue structures; or (ii) detecting and classifying cell types. In some embodiments, the method further comprises the step of generating probability map images based on the at least one of the segmented tissue structures or the detected and classified cell types. In some embodiments, the probability features are derived from the generated probability maps. In some embodiments, the method further comprises the step of detecting nuclei in the first image and wherein the features derived from the first image are computed based on the detected nuclei.

In another aspect of the present disclosure is a computer-implemented method comprising the steps of: (a) running an imaging module to provide first and second images; (b) running an image registration module to register the images and map at least a portion of the first image to the second image to form a registered image; (c) running a nucleus detection module and/or a feature extraction module to derive features from the first image; (d) running the nucleus detection module and/or the feature extraction module to derive features from the registered image; (e) running a segmentation module to identify tissues types and/or cell types from one of the first image or the registered image; (f) running a region map generation module on the identified tissue types and/or cell types such that a probability features map be generated; (g) running a feature extraction module to derive probability features from the probability features map; (h) running a classification module to classify nuclei in one of the first image or the registered image based on the features derived from the first image, the features derived from the registered image, and the derived probability features. In some embodiments, the method further comprises (i) running a scoring module to score the classified nuclei. In some embodiments, the image in which the nuclei are classified is the image comprising signals corresponding to biomarkers (e.g. a biomarker image).

In another aspect of the present disclosure is a computing device configured to classify nuclei comprising one or more processors and at least one memory, the at least one memory storing non-transitory computer-readable instructions for execution by the one or more processors to cause the one or more processors to execute instructions to: receive first and second input images; perform an analysis of the first image, including deriving features from the first image; register at least a portion of the first image to the second image to form a registered image; performing an analysis of the registered image, including deriving features from the registered image; merging the features derived from the first image and features derived from the second image, wherein the features derived from one of the first image or the registered image include probability features; and classifying nuclei in at least one of the images based on the merged features set. In some embodiments, the probability features are computed by (i) generating a probability map from one of the first image or the registered image; and (ii) deriving features from the generated probability map.

In another aspect of the present disclosure is a non-transient computer readable storage medium comprising executable instructions to: receive first and second input images; perform an analysis of the first image, including deriving features from the first image; register at least a portion of the first image to the second image to form a registered image; perform an analysis of the registered image, including deriving features from the registered image; merge the features derived from the first image and features derived from the second image, wherein the features derived from one of the first image or the registered image include probability features; and classify nuclei in at least one of the images based on the merged features set. In some embodiments, the probability features are computed by (i) generating a probability map from one of the first image or the registered image; and (ii) deriving features from the generated probability map.

In another aspect of the present disclosure is a non-transitory computer-usable medium embodying computer program code, the computer program code comprising computer executable instructions configured to: receive first and second input images; perform an analysis of the first image, including deriving features from the first image; register at least a portion of the first image to the second image to form a registered image; perform an analysis of the registered image, including deriving features from the registered image; merge the features derived from the first image and features derived from the second image, wherein the features derived from one of the first image or the registered image include probability features; and classify nuclei in at least one of the images based on the merged features set.

In some embodiments, the first image is an H&E image, the second image is a biomarker image, and wherein the probability features are derived from the first image. In some embodiments, a whole tumor region is mapped from the H&E image to the biomarker image to form the registered image. In some embodiments, the computer code further comprises instructions to determine nuclei in the registered image and wherein the features derived from the registered image are computed based on the detected nuclei. In some embodiments, the performing of the analysis of the first image comprises at least one (i) segmenting tissue structures within the first image; or (ii) detecting and classifying cell types within the first image. In some embodiments, the computer code further comprising instructions to generate a probability map based on the at least one of the segmented tissue structures or the detected and classified cell types. In some embodiments, the probability features are derived from the generated probability map.

In some embodiments, the first image is a biomarker image, the second image is an H&E image, and the probability features are derived from the second image. In some embodiments, a region of the biomarker image is mapped to the H&E image to form the registered image. In some embodiments, the performing of the analysis of the registered image comprises at least one (i) segmenting tissue structures within the first image; or (ii) detecting and classifying cell types within the first image. In some embodiments, the computer code further comprises instructions to generate a probability map based on the at least one of the segmented tissue structures or the detected and classified cell types. In some embodiments, the probability features are derived from the generated probability map. In some embodiments, the computer code further comprises instructions to detect nuclei in the first image and wherein the features derived from the first image are computed based on the detected nuclei. In some embodiments, the computer code further comprises instructions to score the classified nuclei.

In one aspect of the present disclosure is a computer-implemented method for analysis of a tissue sample comprising: receiving first and second input images, wherein one of the first or second input images corresponds to a biomarker image and wherein the other of the first or second input images corresponds to an H&E image; performing an analysis of the first image, including deriving features from the first image; registering at least a portion of the first image to the second image to form a registered image; performing an analysis of the registered image, including deriving features from the registered image; merging the features derived from the first image and features derived from the second image, wherein the features derived from one of the first image or the registered image include probability features; and classifying nuclei in the input image corresponding to the biomarker image. In one embodiment, the biomarker image comprises signals corresponding to a presence of at least one of an estrogen receptor marker, a progesterone receptor marker, a Ki-67 marker, or a HER2 marker. In another embodiment, the biomarker image comprises signals corresponding to a presence of a PD-L1 marker, a CD3 marker or a CD8 marker. In one embodiment, the features from the first and/or second images include pyramid histogram features.

Typically, an H&E tissue slide is used for the initial primary diagnosis to detect, grade and stage cancer type for a particular tissue indication (breast, prostate, lung cancer etc.). IHC tissue slides, on the other hand, are typically used for cancer subtyping for prognostic and predictive purposes. The tissue morphology, i.e. tumorous glandular regions, cells and lymphocytes and lymphatic regions and stromal regions and cells are easily distinguishable in H&E tissue slide. The IHC tissue slides, stained with either a simplex or multiplex IHC chromogenic assay (DAB, Fast Red, Dual stained), are used to detect and quantify antigen/protein overexpression in the tumor, immune or vascular regions in the tissue. In the manual process to review and interpret IHC slides either under a microscope or on a digital read of a whole slide capture on a computer monitor, pathologists typically also review the corresponding regions in H&E tissue slide images for a better visual understanding of the tissue morphology and disambiguate tissue structures, that may be similar looking in the chromogenic IHC tissue slide. For example, in a IHC tissue slide counter stained tumor nuclei and lymphocytes have a similar chromogenic appearance making it visually difficult to differentiate whereas it is easier to disambiguate tumor cells and lymphocytes in an H&E tissue slide as compared a IHC tissue slide. Thus, typically, pathologist integrate information from H&E and IHC tissue slides for better tissue slide interpretation and scoring.

By way of example, in a manual scoring process, such as for PD-L1 and/or IHC breast cancer tissue slides (ER, PR, Ki67, HER2 etc.), the pathologist is recommended to review both serial sections of H&E and IHC slides for better decision making. For example, in the manual PD-L1 scoring process H&E information at the same region of interest is used to confirm the locations of tumor and stromal regions; H&E information at the same region of interest is used to confirm existence of immune cells within tumor region; and an H&E slide is used to identify and confirm the regions not to score.

Applicants have developed a method for the automated use of H&E tissue slide information in the image analysis and scoring of IHC tissue slides. Based on the regions that are selected by the pathologist to score IHC slides, Applicants have developed an automated method of "mapping back" those selected regions to corresponding regions in the H&E whole slide image using an inter-marker registration algorithm and analyzing those regions using H&E image analysis algorithms to detect various tissue structures and morphology. Applicants have also developed an automated method of using the H&E image analysis results to derive relevant information and metrics for effective and combined use in the image analysis of the corresponding region in the IHC tissue slide.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

FIGS. 3A, 3B, and 3C provide flowcharts outlining the digital pathology workflows described herein, in accordance with some embodiments.

DETAILED DESCRIPTION

Figure 1:
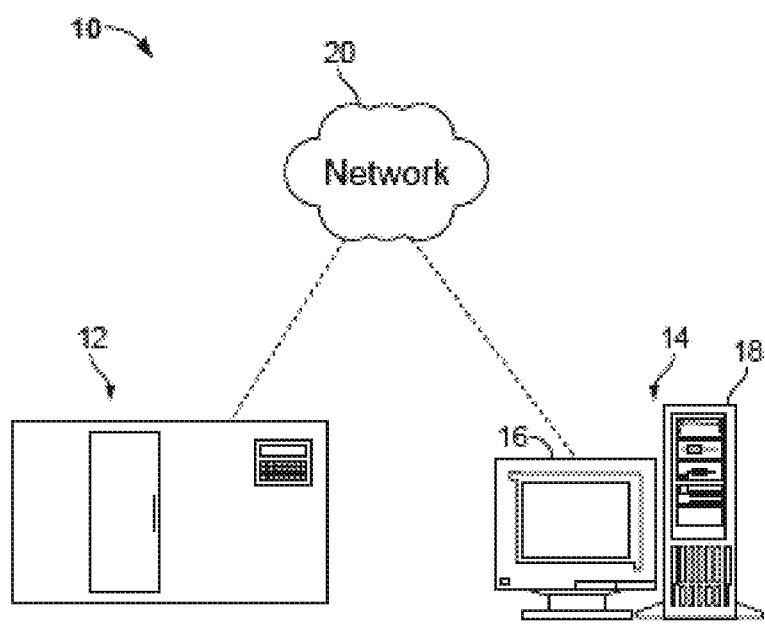
FIG. 1 illustrates a computer system for processing digital images of a tissue sample for analysis, in accordance with some embodiments.

The present disclosure provides digital pathology systems and workflows which utilize information from an H&E whole slide image in the analysis and interpretation of IHC and/or ISH whole slide images (collectively referred to herein as "biomarker images"). Without wishing to be bound by any particular theory, it is believed that the use of an H&E whole slide image in the interpretation of IHC and/or ISH whole slide images allows for the correlation of structural features in the IHC and/or ISH whole slide images to those same structural features in the H&E whole slide image.

As used herein, the singular terms "a," "an," and "the" include plural referents unless the context clearly indicates otherwise. Similarly, the word "or" is intended to include "and" unless the context clearly indicates otherwise.

A "blob" or "pixel blob" as used herein is a region or a spatially connected collection of pixels in a digital image that differs in properties, such as brightness or color, compared to surrounding regions. For example, a blob may be a set of adjacent pixels having a particular intensity value range. Some of the blobs may be classified as "object candidates". Blobs may be detected, for example, by differential methods, which are based on derivatives of the function with respect to position, and methods based on local extrema, which are based on finding the local maxima and minima of the function.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, the term "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

As used herein, a "marker" or "biomarker" is a measurable indicator of some biological state or condition. In particular, a biomarker may be a protein or peptide, e.g. a surface protein, that can be specifically stained and which is indicative of a biological feature of the cell, e.g. the cell type or the physiological state of the cell. An immune cell marker is a biomarker that is selectively indicative of a feature that relates to an immune response of a mammal.

A "mask" as used herein is a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

As used herein a "nucleus blob" or "nuclear blob" is a group of connected pixels around an identified nucleus center/seed, which represents the nucleus.

As used herein, a "tissue sample" refers to any biological sample that is obtained from a human or animal body for anatomic pathology. For example, a tissue sample may be derived from breast tissue, lung tissue, prostate tissue, etc. and may comprise samples derived from tumors, suspected tumors, or from healthy tissue. Other examples of tissue samples and specimens are their preparation are disclosed herein. The tissue sample may be treated in an assay with one or more stains to assist in the identification of structures (e.g. vessels, cells, etc.) within the sample.

Overview

At least some embodiments of the present disclosure relate to computer systems and methods for analyzing digital images captured from biological samples, including tissue samples, stained with one or more primary stains (e.g. hematoxylin and eosin) and one or more detection probes (e.g. probes containing a specific binding entity which facilitates the labeling of targets within the sample). As further disclosed herein, Applicants have developed systems and methods of using selected regions in an IHC or ISH slide image (hereinafter "biomarker images") of a tissue sample and "mapping back" those selected regions to corresponding regions in an H&E image of the tissue sample, where the results from the H&E image analysis are used to aid in the automated analysis of the IHC image.

While specific examples herein may refer to specific tissues and/or the application of specific stains or detection probes for the detection of certain markers (and hence diseases), the skilled artisan will appreciate that different tissues and different stains/detection probes may be applied to detect different markers and different diseases.

Digital Pathology Systems

A computer-based specimen analyzer 10 for analyzing specimens is illustrated in FIG. 1. The computer-based specimen analyzer 10 may comprise an imaging apparatus 12 and a computer 14, whereby the imaging apparatus 12 and computer may be communicatively coupled together (e.g. directly, or indirectly over a network 20). The skilled artisan will appreciate that other computer devices or systems may be utilized and that the computer systems described herein may be communicatively coupled to additional components, e.g. specimen analyzers, scanners or imaging systems, automated slide preparation equipment, etc. Some of these additional components and the various computers that may be utilized are described further herein.

In general, the imaging apparatus 12 (or other image source) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multi spectral imaging (MSI) system or a fluorescent microscopy system. The digitized tissue data may be generated, for example, by an iScan HT scanner or a DP 200 scanner by VENTANA MEDICAL SYSTEMS of Tucson, Ariz. or other suitable imaging equipment. Additional imaging devices and systems are described further herein.

Figure 2:
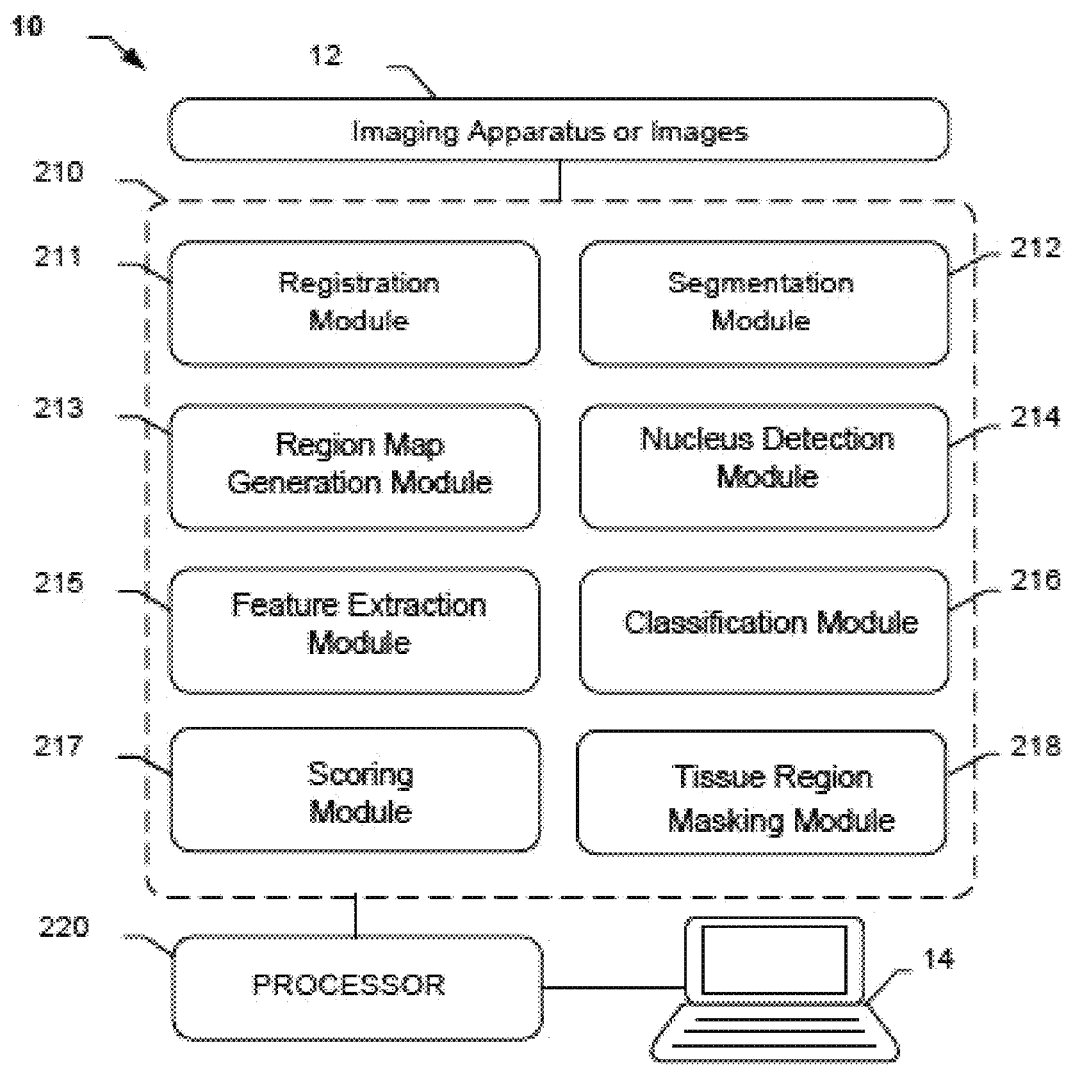
FIG. 2 provides a flowchart outlining modules used in the processing of digital images for analysis, in accordance with some embodiments.

With reference to FIGS. 1 and 2, the computer system 14 can include a desktop computer, a laptop computer, a tablet, or the like, digital electronic circuitry, firmware, hardware, memory 210, a computer storage medium 210, a computer program (e.g. where the program is stored within the memory or storage medium), a processor 220 (including a programmed processor), and/or the like. The computing system 14 illustrated in FIG. 1 may a computer with a display device 16 and an enclosure 18. The computer system can store digital images in binary form (locally, on a server, or another network connected device). The digital images can also be divided into a matrix of pixels. The pixels can include a digital value of one or more bits, defined by the bit depth.

Again, with reference to FIG. 1, the network 20, in some embodiments, interconnects the imaging apparatus 12 and the computer system 14. The network 20 may include, without limitation, one or more gateways, routers, bridges, combinations thereof, or the like. The network 20 may include one or more servers and one or more websites that are accessible to users and can be used to send and receive information that the computer system 14 can utilize. A server may include, without limitation, one or more associated databases for storing information (e.g., digital images, algorithms, staining protocols, cutoff values for comparative evaluations, or the like). The network 20 may include, but is not limited to, data networks using the Transmission Control Protocol (TCP), User Datagram Protocol (UDP), Internet Protocol (IP) and other data protocols. In some embodiments, the computer device or system further comprises a display output or other means of providing data/output to a user, operator, or downstream instrument or process.

FIG. 2 provides an overview of the various modules utilized within the presently disclosed workflows. In some embodiments, the computer device 14 or computer-implemented method comprises one or more processors 220 and at least one memory 210, the at least one memory 210 storing non-transitory computer-readable instructions for execution by the one or more processors to cause the one or more processors to execute instructions in one or more modules (e.g. modules 211 through 218). Alternatively, the instructions may be stored in a non-transitory computer-readable medium (210) or computer-usable medium. In some embodiments, a non-transitory computer-readable media may comprise all computer-readable media except for a transitory, propagating signal.

In some embodiments, the present disclosure provides a computer-implemented comprising the steps of: (a) running an imaging module (12) to provide first and second images; (b) running an image registration module (211) to register at least a portion of the first image to the second image to form a registered image; (c) running a nucleus detection module (214) and/or a feature extraction module (215) to derive features from the first image; (d) running the nucleus detection module (214) and/or the feature extraction module (215) to derive features from the registered image; (e) running a segmentation module (212) to identify tissues types and/or cell types from one of the first image or the registered image; (f) running a region map generation module (213) on the identified tissue types and/or cell types such that a probability features map be generated; (g) running a feature extraction module (215) to derive probability features from the probability features map; (h) running a classification module (216) to classify nuclei in one of the first image or the registered image based on the features derived from the first image, the features derived from the registered image, and the derived probability features. In some embodiments, the method further comprises (i) running a scoring module (217) to score the classified nuclei. In some embodiments, the method further comprises running a tissue region masking module (218). Of course, the skilled artisan will recognize that any of the instructions, algorithms, and filters described for use within each module may be adapted or changed based on the stains being detected or detection probes being utilized. The skilled artisan will also appreciate that the modules may be run in any order.

Figure 3A:
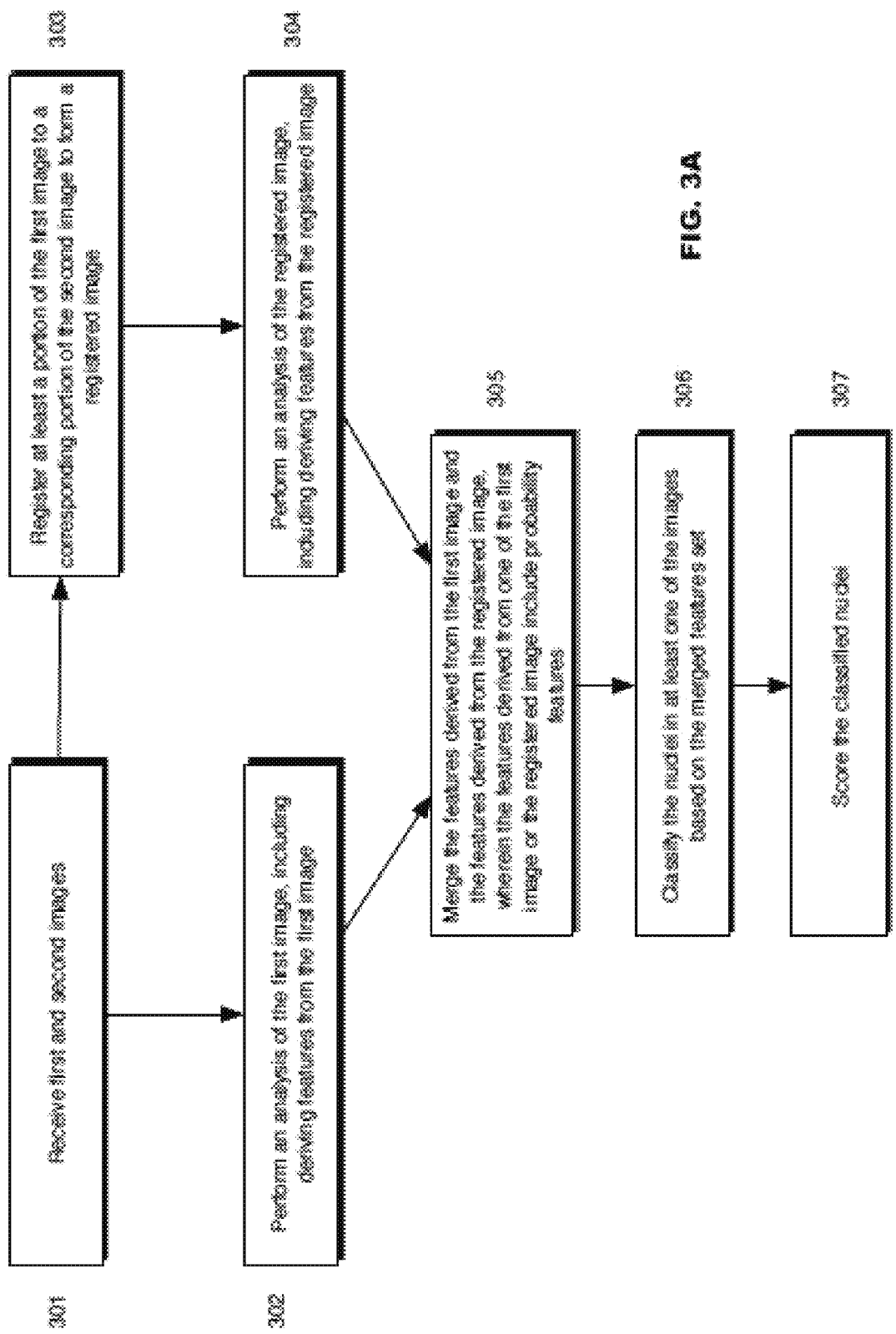
Figure 3C:
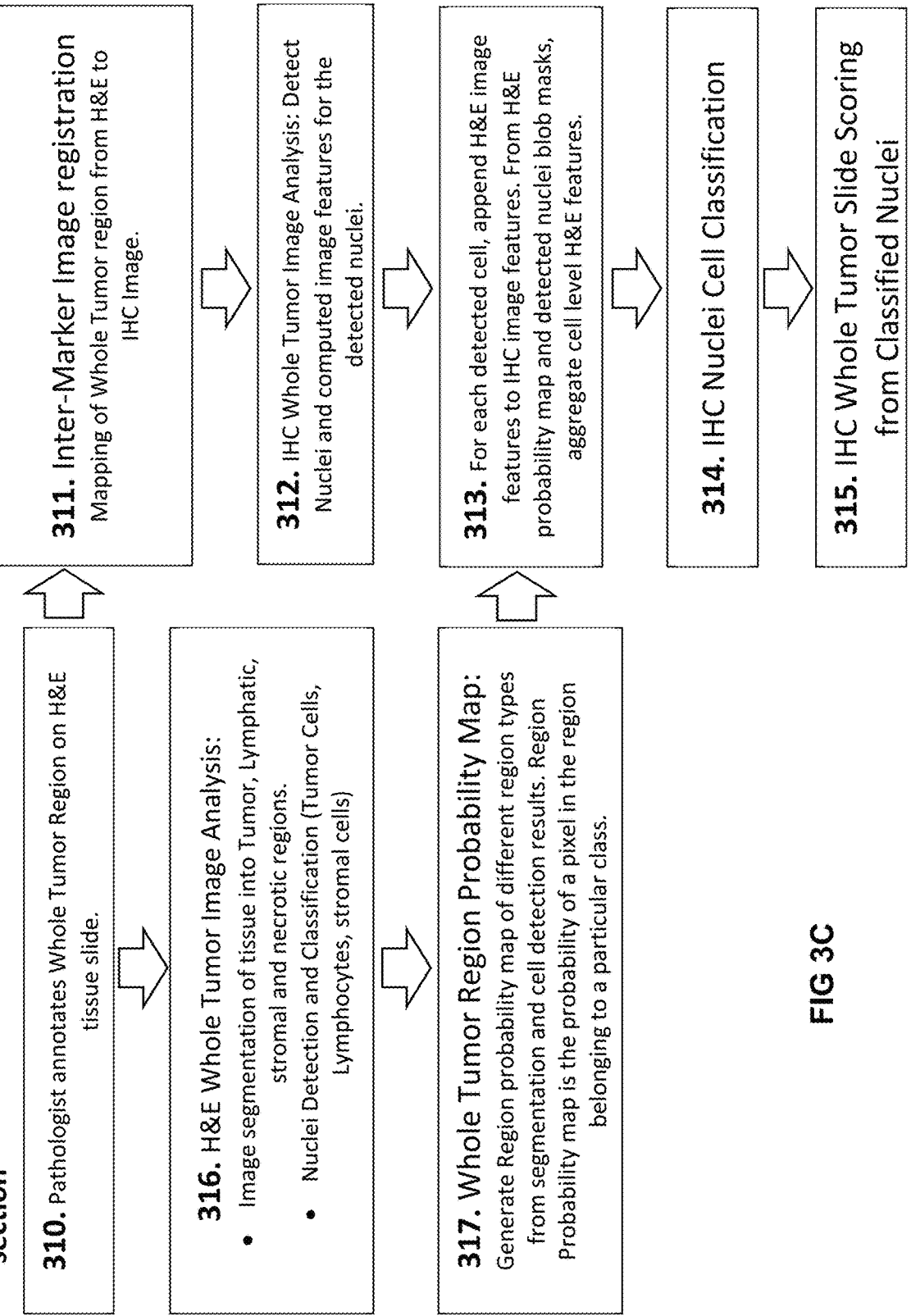

The skilled artisan will appreciate that certain steps of the workflows illustrated in FIGS. 3B and 3C may utilize multiple modules at any particular step of the workflow (e.g. the step of H&E image analysis at step 322 of the workflow depicted in FIG. 3B may utilize the segmentation module 212, the nucleus detection module 214, and the feature extraction module 215). Likewise, the skilled artisan will appreciate that the workflows illustrated in FIGS. 3B and 3C may utilize certain modules at more than one step of the workflow (e.g. the steps of H&E image analysis (step 316) and IHC image analysis (step 312) of the workflow depicted in FIG. 3C both utilize at least the nucleus detection module 214 and the feature extraction module 215).

FIG. 3A sets forth a flowchart which provides a general overview of the methods of the presently disclosed workflow. In general, the method includes receiving at least first and second images as input (step 301); registering at least a portion of the first image to the second image to form a registered image (step 303); independently performing an analysis of the first image (step 302) and the registered image (step 304), wherein the analysis of the first image and registered image includes deriving features from both the first image and the registered image, and wherein at least some of the derived features include probability features; merging the features derived from the first image, the registered image, including the probability features derived from one of the first image or the registered image (step 305); classifying the nuclei within at least one of the first or second images based on the merged feature set (step 306); and scoring the classified nuclei (step 307). In some embodiments, the at least one of the first or second images in which the nuclei are classified at step 306 is the image corresponding to the biomarker image.

FIGS. 3B and 3C further illustrate the workflows of the present disclosure. For example, FIG. 3B illustrates the embodiment where the first image is a biomarker image (e.g. an IHC image), and where the second image is an H&E image. FIG. 3B further illustrates the steps of generating a probability map from the registered H&E image following analysis of the registered H&E image, such that probability features may ultimately be computed from the registered H&E image. Likewise, FIG. 3C illustrates the embodiment where the first image is an H&E image and where the second image is a biomarker image. FIG. 3C further illustrates the steps of generating a probability map from the H&E image (first image) following analysis of the H&E image, such that probability features may be computed from the H&E image.

Input Images

As an initial step, and with reference to FIG. 3A, the computer system receives at least two images as input (step 301). In some embodiments, the images received as input are derived from serial tissue sections, i.e. serial sections derived from the same xenograft tissue block. In some embodiments, the input images are optionally masked with a tissue masking module 218 as described herein.

In general, the at least two images received as input each comprise signals corresponding to a stain (including chromogens, fluorophores, quantum dots, etc.). In some embodiments, one of the images has been stained with at least one primary stain (hematoxylin or eosin), while another one of the images has been stained in at least one of an IHC assay or ISH assay for the identification of a specific biomarker (referred to herein as a "biomarker" image). In some embodiments, one of the images has been stained with both hematoxylin and eosin (referred to herein as an "H&E image"), while another one of the images has been stained in at least one of an IHC assay or ISH assay for the identification of a specific biomarker. In some embodiments, the input images may be multiplex images, i.e. stained for multiple, different markers in a multiplex assay according to methods known to those of ordinary skill in the art.

As the skilled artisan will appreciate, a tissue sample may be stained for different types of nuclei and/or cell membrane biomarkers. Methods for staining tissue structures and guidance in the choice of stains appropriate for various purposes are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)," the disclosures of which are incorporated herein by reference.

In the context of detecting breast cancer, in some embodiments the tissue sample is stained in an IHC assay for the presence of one or biomarkers including an estrogen receptor marker, a progesterone receptor marker, a Ki-67 marker, or a HER2 marker. As such, in some embodiments, the biomarker image used as an input is an IHC image which comprises signals corresponding to a presence of at least one of an estrogen receptor (ER) marker, a progesterone receptor (PR) marker, a Ki-67 marker, or a HER2 marker.

In the context of detecting non-small cell lung cancer, in some embodiments the tissue sample is stained in an IHC assay for the presence of one or biomarkers including a PD-L1 biomarker. As such, in some embodiments, the biomarker image used as an input is an IHC image which comprises signals corresponding to a presence of a PD-L1 marker, CD3 marker and CD8 marker. In some embodiments, the computer-implemented method further comprises the step of scoring the classified nuclei.

In some embodiments, the input images are masked such that only tissue regions are present in the images. To generate these masked images, the input images are provided to a tissue region masking module 218. In some embodiments, a tissue region mask is generated to mask non-tissue regions from tissue regions. The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region.

In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2). In some embodiments, an image segmentation technique is utilized to distinguish between the digitized tissue data and the slide in the image, the tissue corresponding to the foreground and the slide corresponding to the background. In some embodiments, the component computes the Area of Interest (AoI) in a whole slide image in order to detect all tissue regions in the AoI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the component can also generate a tissue foreground mask that can be used to identify those portions of the digitized slide data that correspond to the tissue data. Alternatively, the component can generate a background mask used to identify those portions of the digitized slide date that do not correspond to the tissue data.

Figure 4:
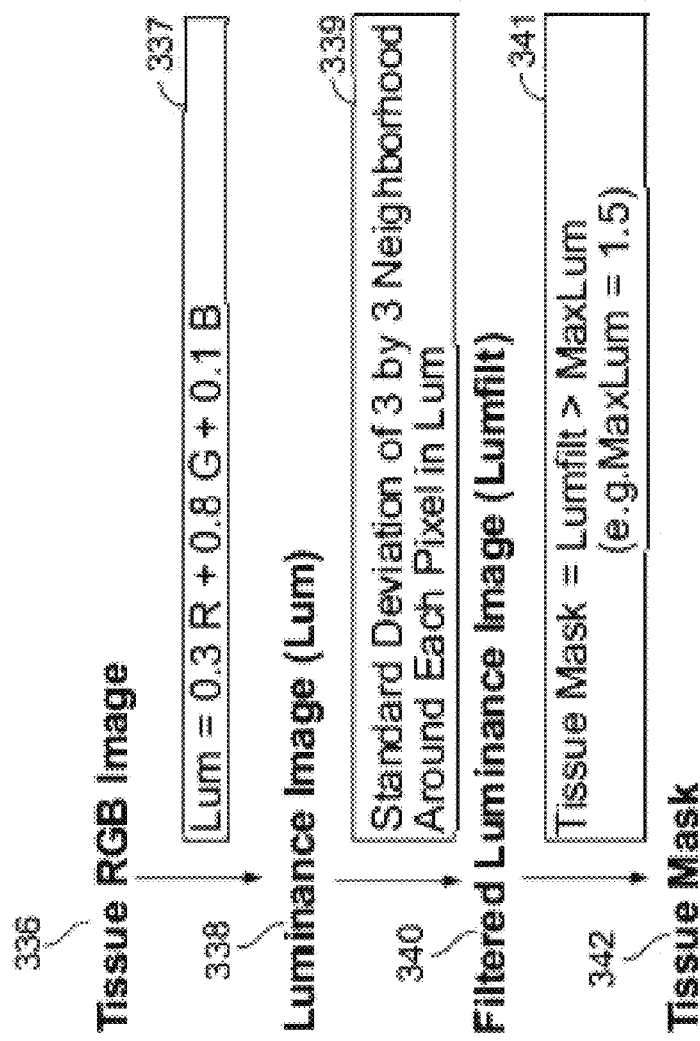
FIG. 4 sets forth a flowchart outlining the steps of generating a tissue region mask, in accordance with some embodiments.

With reference to FIG. 4, in some embodiments, the generation of the tissue region masked image comprises one or more of the following non-limiting operations: computing the luminance (337) of a low resolution input single marker channel image (336), producing a luminance image (338) from the single marker channel image, applying a standard deviation filter to the produced luminance image (339), computing a filtered luminance image (340) from the produced luminance image, and applying a threshold to filtered luminance image (341), such that pixels with a luminance above a given threshold are set to one, and pixels below the threshold are set to zero, producing the tissue region mask (342). Additional information and examples relating to the generation of tissue region masks is disclosed in PCT/EP/2015/062015, entitled "An Image Processing Method and System for Analyzing a Multi-Channel Image Obtained from a Biological Tissue Sample Being Stained by Multiple Stains," the disclosure of which is hereby incorporated by reference herein in its entirety.

Image Annotation

In some embodiments, input images are annotated by a user, a medical professional, or a pathologist to facilitate intermarker registration and image analysis (see, steps 321 and 310 of FIGS. 3B and 3C, respectively). In some embodiments, and with reference to FIG. 3B, a user, medical professional, or pathologist identifies portions (e.g. subregions) of a biomarker image (e.g. an IHC whole image) suitable for further analysis (step 321), and those identified portions are subsequently transferred from the biomarker image to corresponding portions in an H&E image (step 326) as set forth herein. In some embodiments, the identified portions are representative of over-expressive tumorous regions of a specific biomarker, e.g. a specific IHC marker.

In other embodiments, and with reference to FIG. 3C, a user, medical professional, or pathologist annotates a whole tumor region on an H&E image (step 310), and those identified portions are subsequently transferred from the H&E image to corresponding portions in the biomarker image (step 311) as set forth herein.

In some embodiments, annotated representative fields may be selected by a pathologist to reflect the biomarker expression that the pathologist would use for overall slide interpretation. Annotations may be drawn using an annotation tool provided in a viewer application (e.g. VIRTUOSO/VERSO™ or like software) and the annotations may be drawn at any magnification or resolution. Alternatively, or in addition, image analysis operations may be used to automatically detect tumor regions or other regions using automated image-analysis operations such as segmenting, thresholding, edge detection, etc., and FOVs automatically generated based on the detected regions.

Intermarker Registration

Following receipt of the first and second images and/or their annotation, at least a portion of the first image is registered to a corresponding portion of the second image to form a registered image (step 303). In some embodiments, an intermarker registration module 211 is used to map at least one portion of a first image (e.g. a biomarker image) to a corresponding portion of a second image (e.g. an H&E image). In doing so, the first and second images become mapped to a common coordinate system. In some embodiments, the portions of the first image are those identified in an upstream process as comprising features suitable for further analysis (e.g. annotated by a pathologist or via an automated FOV selection process, as noted above). In some embodiments, intermarker registration is accomplished using the registration module 211.

In general, intermarker registration comprises selecting one input image, or a portion thereof, to serve as a reference image, and computing a transformation of each other input image to the coordinate frame of the reference image. Accordingly, all the input images may be aligned to the same coordinate system (e.g. the reference coordinate can be the slide section in the middle of the tissue block in the case of serial tissue sections or the slide with a specific marker) using image registration. Each image may therefore be aligned from its old coordinate system to the new reference coordinate system.

Intermarker registration is the process of transforming different sets of data, here images, or markers within images, into one coordinate system. More specifically, intermarker registration is the process of aligning two or more images and, in general, involves designating one image as the reference (also called the reference image or the fixed image), and applying geometric transformations to the other images so that they align with the reference. A geometric transformation maps locations in one image to new locations in another image. The step of determining the correct geometric transformation parameters is key to the image registration process. The methods for computing a transformation of each image to a reference image are well known to those skilled in the art. For example, an image registration algorithm is described, for example, in "11th International Symposium on Biomedical Imaging (ISBI), 2014 IEEE, Apr. 29, 2014-May 2, 2014), the disclosure of which is hereby incorporated by reference herein in its entirety. A detailed method of image registration is outlined below.

Intermarker registration processes are well known in the art and any of the known methods may be applied to the present disclosure. In some embodiments, the intermarker or image registration is performed using the methods described in WO/2015/049233, entitled "Line-Based Image Registration and Cross-Image Annotation Devices, Systems and Methods," filed on Sep. 30, 2014, the disclosure of which is hereby incorporated by reference herein in its entirety. WO/2015/049233 describes a registration process comprising a coarse registration process used alone or in combination with a fine registration process. In some embodiments, the coarse registration process may involve selecting digital images for alignment, generating a foreground image mask from each of the selected digital images, and matching tissue structure between the resultant foreground images. In further embodiments, generating a foreground image mask involves generating a soft-weighted foreground image from the whole slide image of a stained tissue section and applying OTSU thresholding to the soft-weighted foreground image to produce a binary soft-weighted image mask. In other further embodiments, generating a foreground image mask involves generating a binary soft-weighted image mask from a whole slide image of a stained tissue section, separately generating a gradient magnitude image mask from the same whole slide image, applying OTSU thresholding to the gradient image mask to produce a binary gradient magnitude image mask, and combining the binary soft-weighted image and the binary gradient magnitude image mask using a binary OR operation to generate the foreground image mask. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. A "gradient orientation feature" may be a data value that indicates the orientation of the gradient within said coordinate system. In some embodiments, matching tissue structure involves computing line-based features from the boundary of each of the resultant foreground image masks, computing global transformation parameters between a first set of line-features on a first foreground image mask and a second set of line-features on a second foreground image mask, and globally aligning the first and second image based on the transformation parameters. In yet further embodiments, the coarse registration process includes mapping the selected digital images based on the global transformation parameters to a common grid, which grid may encompass the selected digital images. In some embodiments, the fine registration process may involve identifying a first sub-region of a first digital image in the set of aligned digital images; identifying a second sub-region on a second digital image in the set of aligned digital images, wherein the second sub-region is larger than the first sub-region and the first sub-region is located substantially within the second sub-region on common grid; and, computing an optimized location for the first sub-region in the second sub-region.

Figure 5:
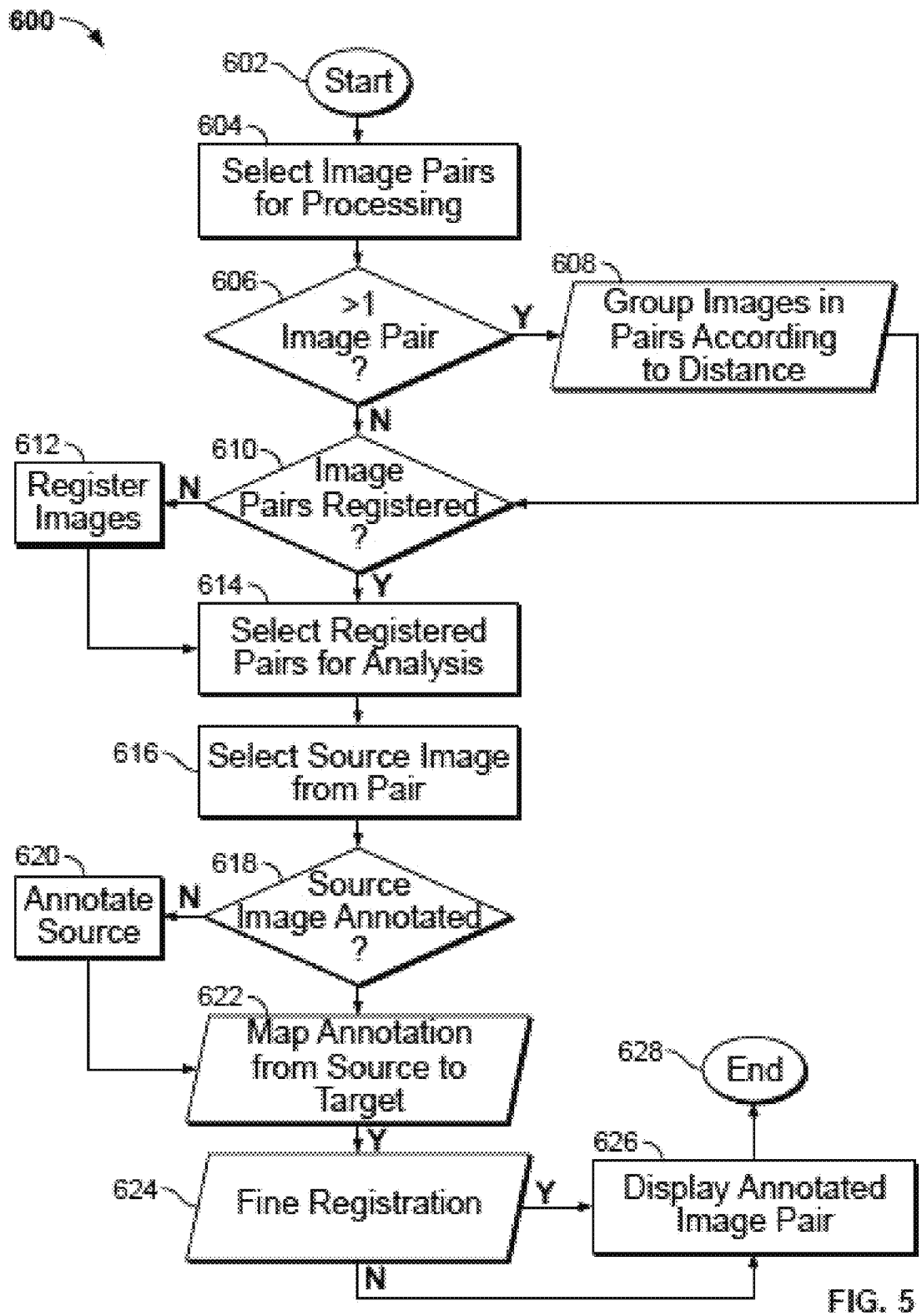
FIG. 5 provides a flowchart illustrating the steps of intermarker registration, in accordance with some embodiments.

These methods are illustrated in FIG. 5 herein, where the method 600 begins at the start block 602. At block 604, a set of image data or digital images is acquired (e.g. scanned or selected from the database) for manipulation. Each set of image data includes image data corresponding to, for example, a tissue section from a set of adjacent tissue sections of a single patient. At block 606, if only a single image pair is selected, the process proceeds directly to block 610. If more than a single pair of images is selected, then the set of selected images is grouped into pairs at block 608 prior to proceeding to block 610. In some embodiments, image pairs are selected as adjacent pairs. Thus, for example, if the set of selected images includes 10 parallel, adjacent slices (LI . . . LI 0), then LI and L2 are grouped as a pair, L3 and L4 are grouped as a pair, etc. On the other hand, if information is not available as to which pairs of images are most similar to each other then, in some embodiments, images are grouped according to their distance apart, (e.g., inter-edge or inter-image distance corresponding to the chamfer distance between the edge-maps of the various images), pairing together images which are closest to one another. In exemplary embodiments of the present disclosure, an inter-edge/inter-image distance is utilized to pair of images. In some embodiments, edge-based Chamfer distance may be used to compute the inter-image/inter-edge distance. If the pairs of images have previously undergone a coarse registration process, such that the images have been coarsely aligned and the results have been saved, the process advances to block 614. Otherwise, at block 612 a coarse registration process is performed on the selected image pairs. The coarse registration process is described in further detail below.

Passing to block 614, the selected, and now registered (aligned), images are displayed on a common grid, with the images overlaid in a single image, displayed as separate images, or both, on a single monitor or spread across several monitors. At block 616, the client user may select one of the images from a pair of images as the source image. If the source image has already been annotated as desired, the process proceeds to block 622. Otherwise, the client user annotates the source image as desired at block 620. At block 622, which may (or may not) occur substantially simultaneously with block 620, the annotation is mapped to the other image in the pair (the target image) and graphically reproduced on the target image. In embodiments wherein annotation occurs prior to coarse registration, the annotation may be mapped from the source image to the target image at substantially the same time as the pair of images is registered (aligned). At block 624, the user may choose to whether or not to engage in a fine registration process. If the user chooses to directly display the results without performing fine registration, the process proceeds to block 626.

Otherwise, at block 624 a fine registration process is performed on the selected image pairs, for example to optimize the location of the mapped annotations and/or alignment of the images. The fine registration process is discussed in further detail below. At block 626, the annotated image pair is displayed with the results of the fine registration process (or the annotated image pair may be displayed only with the results of the coarse registration process if fine registration is not used). The method then ends at the final block 628.

Image Analysis

With reference to FIG. 3A, and following registration of at least a portion of the first image to a corresponding portion of the second image to form a registered image, the first image and the registered images are both analyzed (steps 302 and 304), such that features or metrics are derived from each image. As noted herein, the features that are derived include (i) H&E image features, (ii) biomarker image features, and (iii) probability features derived from a probability map images computed from identified tissues and/or cells within the H&E image. Together, the H&E image features, the biomarker image features, and the probability features are merged together (step 305) such that cell nuclei present in at least one of the input images may be classified (step 306) and/or scored (step 307). The steps necessary for carrying out image analysis are described herein.

In some embodiments, the biomarker image features and H&E image features include nuclear features which are derived from the biomarker image. In some embodiments, the derivation of features from the biomarker image and/or H&E image include detecting nuclei within the image and then extracting features from the detected nuclei or from image patches surrounding the detected nuclei (see, for example, step 312 of FIG. 3C). These methods are described herein.

In other embodiments, the probability features, while ultimately derived from an H&E image, first requires identifying either different tissues and/or cell types within the H&E image (i.e. segmenting tissues and/or detecting and classifying cell types); followed by generating a probability map based on either the differently identified tissues and/or cell types; and then deriving probability features from the probability map. These methods are also further described herein (see, for example, step 316 of FIG. 3C).

Derivation of Features from the Biomarker and H&E Images

In some embodiments, the derivation of features from the biomarker image and/or H&E image includes detecting nuclei within the image and then extracting features from the detected nuclei or from image patches surrounding the detected nuclei.

Nucleus Detection

In some embodiments, nuclei are detected in each of the input IHC images, such as with a nuclear detection module 214. Once the nuclei are detected, features may be derived from the identified nuclei or from image patches surrounding the nuclei, such as with a feature extraction module 215.

In some embodiments, the images received as input are processed such as to detect nucleus centers (seeds) and/or to segment the nuclei. For example, instructions may be provided to detect nucleus centers based on radial-symmetry voting using techniques commonly known to those of ordinary skill in the art (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein). In some embodiments, a nucleus detection module 214 identifies nuclei using radial symmetry to detect centers of nuclei and then classifies the nuclei based on the intensity of stains around the cell centers. For example, given a single image channel, an image magnitude is computed from the channel, and one or more votes at each pixel are accumulated by adding the summation of the magnitude within a selected region. Mean shift clustering may be used to find the local centers in the region, with the local centers representing actual nuclear locations.

Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range $[\pi/4, \pi/8]$). In the resulting voting space, local maxima locations that have a vote value higher than a predefined threshold value are saved out as seed points. Extraneous seeds may be discarded later during subsequent segmentation or classification processes.

Nuclei may be identified using other techniques known to those of ordinary skill in the art. For example, an image magnitude may be computed from a particular image channel of one of the H&E or IHC images, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, once the seeds are detected, a locally adaptive thresholding method may be used, and blobs around the detected centers are created. In some embodiments, other methods may also be incorporated, such as marker based watershed algorithms can also be used to identify the nuclei blobs around the detected nuclei centers. These and other methods are described in co-pending application PCT/EP2016/051906, published as WO2016/120442, the disclosure of which is incorporated by reference herein in its entirety.

Feature Extraction

Following detection of the nuclei, features (or metrics) are derived, such as with a feature extraction module 215. In general, the feature extraction module 215 receives image data, derives certain metrics based on the received image data, and outputs those derived metrics for combination with the separately computed probability features (step 305). In some embodiments, separate metrics are computed from the biomarker image and from the H&E image.

More specifically, metrics may be derived from features of the identified nuclei or from within a patch surrounding an identified nucleus in both the H&E and biomarker images. For example, a feature metric can be a numerical data value being indicative of quantitative properties of a particular feature, a histogram, a distribution, or the like. In some embodiments, feature metrics are computed for each nucleus based on their visual properties and descriptors, e.g. morphology features, appearance features, background features, etc. In other embodiments, features are computed from within an image patch surrounding an identified nucleus. In some embodiments, the various feature metrics derived from the detected nuclei of the H&E and biomarker images are supplied as vectors of metrics and, together with metrics derived from the generated probability map (step 304 or 317), are supplied to the classification module 216 for classification (step 307 or 314).

The skilled artisan will appreciate that differently stained tissue samples (e.g. those stained in an IHC process for a particular biomarker versus tissue stained with H&E or another primary stain) may reveal different biological features (e.g. Ki67 stains for a nuclear marker; immune cells expressing different cluster of differential markers, etc.). Moreover, different metrics may be derived based on the different morphologic features to assist in overall analysis, classification, and scoring. For example, lymphocytes can be identified based on their typical morphology, i.e. small, round and homogeneously basophilic nuclei which differentiates them from other leukocytes, such as neutrophils with more elongated and segmented nuclei. Thus, for example, in certain breast tumor types, lymphocytes can be differentiated in general from cancer cells, which have larger and more pleomorphic nuclei. Thus, the skilled artisan will appreciate that metrics (e.g. area, compactness, etc.) derived from these morphological features are important in classifying nuclei.

The derivation of metrics from nuclear features are well known in the art and any nuclear features known may be used in the context of the present disclosure. Non-limiting examples of metrics that may be computed include:

(A) Metrics Derived from Morphology Features

A "morphology feature" as used herein is, for example, a feature being indicative of the shape or dimensions of a nucleus. Without wishing to be bound by any particular theory, it is believed that morphological features provide some vital information about the size and shape of a cell or its nucleus. For example, a morphology feature may be computed by applying various image analysis algorithms on pixels contained in or surrounding a nuclear blob or seed. In some embodiments, the morphology features include area, minor, and major axis lengths, perimeter, radius, solidity, etc.

Morphology Feature Example (i)

The size of the nuclear blob, in terms of the number of pixels, may be used as a feature. Area=total number of pixels in the nucleus region;

Morphology Feature Example (ii): Minor/MajorAxisLength

Scalar specifying the length (in pixels) of the minor/major axis of the ellipse that has the same normalized second central moments as the region. By way of example, based on the nucleus blob mask detected around an identified nucleus or seed point, a blob shape may be approximated by an ellipse. The minor axis of the ellipse is used as a feature along with the eccentricity parameter (computed as the ratio of minor axis to major axis);

Morphology Feature Example (iii): Perimeter

Number of pixels on the boundary of the nuclei regions;

Morphology Feature Example (iv): Radius

Average distance from the center of the nucleus to the boundary pixels of the nucleus;

Morphology Feature Example (v): Solidity

Scalar specifying the proportion of the pixels in the convex hull that are also in the region (Computed as Area/ConvexArea)].

Morphology Feature Example (vi): Blob Compactness

Considering a circular region centered at a blob center which has the same area as the blob, the area of the overlapped region between this circular region and the blob is called "overlap area," the compactness feature of the blob is then computed as: Compactness=Overlap Area/Blob Area. This feature is used to differentiate irregular and non-nuclei shapes from nuclei.

Morphology Feature Example (vii): Blob Density

In some embodiments, a "blob density" feature is expected to be highly discriminatory for lymphocytes versus stromal. For lymphocytes, the cells are more closely packed than for stromal cells. Also, for lymphocytes, an average blob size may lower than for certain nuclei that stain negative for certain biomarkers. Hence, a density based feature is used which accounts for both the packing density of the nearby seeds and the distribution of the neighborhood blob sizes. The features are computed using a window of size (2*radius+1)×(2*radius+1) around a given seed for multiple values of radii, e.g. ranging from 5 urn to 25 urn. For each radius value, the following features are computed: Blob Pixel density, Blob Seed Density, Normalized pixel density (normalized with average size of the nucleus blob), Normalized Seed density feature.

Morphology Feature Example (viii): Major axis direction where the angular orientation of the line of best fit through the center of gravity is measured.

(B) Metrics Derived from Appearance Features

An "appearance feature" as used herein is, for example, a feature having been computed for a particular nucleus by comparing pixel intensity values of pixels contained in or surrounding a nuclear blob or seed used for identifying the nucleus, whereby the compared pixel intensities are derived from different image channels (e.g. a background channel, a channel for the staining of a biomarker, etc.). In some embodiments, the metrics derived from appearance features are computed from percentile values (e.g. the 10th, 50th, and 95th percentile values) of pixel intensities and of gradient magnitudes computed from different image channels. For example, at first, a number P of X-percentile values (X=10, 50, 95) of pixel values of each of a plurality IC of image channels (e.g. three channels: HTX, DAB, luminance) within a nuclear blob representing the nucleus of interest are identified. Computing appearance feature metrics may be advantageous since the derived metrics may describe the properties of the nuclear regions (e.g., and in the context of staining for the PDL1 biomarker dark brown nuclei, dark blue nuclei, light blue nuclei, etc.) as well as describe the membrane region (again, in the context of staining for the PDL1 biomarker) (the ribbon region) around the nuclei, e.g., if the membrane stain are light brown, dark brown or no staining at all, etc.

(C) Metrics Derived from Background Features

A "background feature" is, for example, a feature being indicative of the appearance and/or stain presence in cytoplasm and cell membrane features of the cell comprising the nucleus for which the background feature was extracted from the image. A background feature and a corresponding metrics can be computed for a nucleus and a corresponding cell depicted in a digital image e.g. by identifying a nuclear blob or seed representing the nucleus; analyzing a pixel area (e.g. a ribbon of 20 pixels—about 9 microns—thickness around the nuclear blob boundary) directly adjacent to the identified set of cells are computed in, therefore capturing appearance and stain presence in cytoplasm and membrane of the cell with this nucleus together with areas directly adjacent to the cell. These metrics are similar to the nuclear appearance features, but are computed in a ribbon of about 20 pixels (about 9 microns) thickness around each nucleus boundary, therefore capturing the appearance and stain presence in the cytoplasm and membrane of the cell having the identified nucleus together with areas directly adjacent to the cell. Without wishing to be bound by any particular theory, the ribbon size is selected because it is believed that it captures a sufficient amount of background tissue area around the nuclei that can be used to provide useful information for nuclei discrimination. These features are similar to those disclosed by "J. Kong, et al., "A comprehensive framework for classification of nuclei in digital microscopy imaging: An application to diffuse gliomas," in ISBI, 2011, pp. 2128-2131" the disclosure of which is incorporated by reference in its entirety herein. It is believed that these features may be used to determine whether the surrounding tissue is stroma or epithelium (such as in H&E stained tissue samples). Without wishing to be bound by any particular theory, it is believed that these background features also capture membrane staining patterns, which are useful when the tissue samples are stained with appropriate membrane staining agents (e.g. PDL1). Again, in the context of PDL1, since the PD-L1 biomarker mostly stains the cell membrane the staining creates a brown ribbon, brown spots, or both along the outside of the nucleus boundaries.

(D) Metrics Derived from Color.

In some embodiments, metrics derived from color include color ratios, R/(R+G+B). or color principal components. In other embodiments, metrics derived from color include local statistics of each of the colors (mean/median/variance/std dev) and/or color intensity correlations in a local image window.

(E) Metrics Derived from Intensity Features

The group of adjacent cells with certain specific property values is set up between the dark and the white shades of grey colored cells represented in a histopathological slide image. The correlation of the color feature defines an instance of the size class, thus this way the intensity of these colored cells determines the affected cell from its surrounding cluster of dark cells.

(F) Metrics Derived from Texture Features

Texture Features Example (i): Context-Texture Features

In some embodiments, a context-texture method is used to compute a set of textural features from an image patch centered at a nucleus of interest (NoI). More specifically, the context-texture method allows the textual pattern in a region around each NoI to be captured and this information is used to assist in the identification of the local type of tissue in which the NoI may be lying (e.g. regions around any NoI may include solid tumor, aggregates of lymphocytes (immune cells), stroma, and/or overall staining responses). For example, stroma is characterized by a fiber-like texture, while the presence of multiple "blobs" of varying size is characteristic of a tumor region. By computing the textural features in image patches of a region surrounding the fiber-like textures or blobs, the information could assist in classifying any cell or cell nucleus in the region as belonging to stroma, as opposed to tumor tissue, or vice-versa. Procedures for deriving context-texture features and image patches images surrounding a NoI are described in a copending application published as WO/2016/075096, entitled Classifying Nuclei in Histology Images, the disclosure of which is incorporated by reference herein in its entirety. In general, the context-texture method is performed by capturing images patches centered at each NoI. In some embodiments, a patch size having a size S×S is selected which captures a reasonably large tissue area that provides rich contextual information about the nucleus. In other embodiments, the patch size ranges from between about 50 pixels to about 200 pixels in any S×S dimension. In yet other embodiments, a patch size of about 150 pixels (about 70 microns) is used. In some embodiments, patches are created only for a specific tissue type. For example, patches may be created only for regions positive for a particular biomarker. After the image patch is captured, textural features are computed within each patch. In some embodiments, the textural features computed include features such as histogram of intensities, histogram of gradient magnitude and gradient orientation, Gabor features, and Haralick features.

"Gabor feature" is, for example, a feature of a digital image having been extracted from the digital image by applying one or more Gabor filters on the digital image. The one or more Gabor filters may have different frequencies and/or orientations. A Gabor filter is, for example, a linear filter that can be used for detecting patterns in images, e.g. for detecting edges. Frequency and orientation representations of Gabor filters are similar to those of the human visual system, and they have been found to be particularly appropriate for texture representation and discrimination. Gabor filters are linear filters often used in image analysis, e.g. for edge detection. For example, a Gabor filter can be a Gaussian kernel function modulated by a sinusoidal plane wave.

It is believed that Gabor filters have the ability to model the frequency and orientation sensitivity characteristic of the human visual system. The Gabor filter convolves the image with log-Gabor filters in a plurality of different orientations and at different scales and then averages the responses of the different orientations at the same scale to obtain rotation-invariant features. A response of a Gabor filter is the result of applying a Gabor filter on intensity values of a set of image pixels. A response calculated for pixels of an image patch comprising a NoI may be used as contextual information metrics of the NoI. In some embodiments, the Gabor filter is used to calculate the average, standard deviation, minimum-to-maximum ratio on the average responses, which may be used as contextual information metrics. More information on Gabor filters and their application may be found in 'Jain, A. K., Farrokhnia, F.: "Unsupervised texture segmentation using Gabor filters." IEEE Int. Conf. System, Man., Cyber., pp. 14-19 (1990)," the disclosure of which is hereby incorporated by reference in its entirety herein. Again, these features may be supplied to the classification module.

Haralick features are believed to capture information about the patterns that emerge in patterns of texture. The Haralick texture values are computed with a co-occurrence matrix. This matrix is a function of both the angular relationship and distance between two pixels (that may be separated from each other by some distance) and shows the number of occurrences of the relationship between two specified pixels. A "Haralick texture feature" or "Haralick feature" is, for example, a feature of a digital image having been extracted from a co-occurrence matrix, which contains information about how image intensities in pixels of the digital image with a certain position in relation to each other occur together. To calculate the Haralick features, the co-occurrence matrix can, for example, be normalized by basing the intensity levels of the matrix on the maximum and minimum intensity observed within each object identified in the digital image. Haralick, Shanmugan, and Dinstein (1973) refer to this as a "gray-tone spatial-dependence matrix." Their implementation that is used in embodiments of the disclosure considers four directions (0°, 45°, 90°, and 135°) between pixels that are separated by some distance, d. (See Haralick, R., Shanmugan, K., and Dinstein, I. "Textural Features for Image Classification." IEEE Transactions on Systems, Man, and Cybernetics 3, no. 6 (1973): 610-621, the disclosure of which is incorporated herein by reference in its entirety).

A co-occurrence matrix (i.e., a spatial dependency co-occurrence matrix) is computed for pixels in the patch centered at the NoI. According to embodiments, a co-occurrence matrix is computed for each of a plurality of predefined directions (or "angles"), e.g. for the four directions 0°, 45°, 90°, and 135°. From the generated co-occurrence matrix or co-occurrence matrices, a plurality of features may be calculated including autocorrelation, contrast, correlation, dissimilarity, energy, entropy, homogeneity, maximum probability, variance, sum average, sum variance, Sum entropy, difference variance, difference entropy, two information measures of correlation, inverse difference, normalized inverse difference, and inverse moment. Each of the parameters may represent a relation between different data entries in the co-occurrence matrix, e.g. the correlation of the feature "high intensity value in the brown color channel" and a particular bin value for grey value gradient size. Extracting these values from each channel under consideration and taking the mean, standard deviation, and mode of each feature image yields a significant number of co-occurrence features. Any of these features may be used as contextual information metrics.

Calculating the co-occurrence matrix for the pixels in the patch may be advantageous, as the co-occurrence matrix may indicate biological information that may be an indicator of a particular cell type or tissue type. For example, the co-occurring matrix and contextual information metrics derived therefrom may describe how often a blue pixel (pixels within the nuclei) is close to (within a distance d) a brown pixel (pixel of the membrane staining).

In some embodiments, the gray-level co-occurrence matrix ("GLCM") is computed for each image channel individually and the respective Haralick texture values are derived from each image channel separately. In addition to the conventional gray-level co-occurrence matrix ("GLCM"), which is computed for each channel individually, the inter-channel or color co-occurrence matrix ("CCM") may be used. The CCM is created from the co-occurrence of pixel intensities in two different image channels, i.e. to compute the CCM from the two channels (e.g. Ci; Cj) using a displacement vector (e.g. d=[dx; dy]). The co-occurrence is computed of the pixel intensity at location (x;y) in Ci and the pixel intensity at location (x+dx; y+dy) in Cj. It is believed that the CCM offers that advantage of capturing the spatial relationship between different tissue structures (highlighted in different channels), without the need of explicitly segmenting them. For example, in case a first biomarker is known to be expressed on the outer surface of a cell membrane and a second biomarker is known to be expressed on the inner surface of a cell membrane, the first and second biomarkers being stained by different stains whose signals are captured in two different image channels, the intensity values of the signals in the two different channels will correlate (with a predefined offset), because inner-membrane proteins and outer-membrane proteins will always or predominantly generate signals in close spatial proximity to each other. Said spatial proximity may be captured in a CCM matrix in the form of pixel intensity correlations in different channels.

In some embodiments, Haralick features are computed from the GLCMs of all the channels under consideration. Again, any of the features computed from the CCM may be used as contextual information metrics. The inter-channel matrix is computed, according to embodiments, in the same or similar manner as the GLCM matrix. Multiple different angles and distances may be considered. The only difference is that the pair of pixels are picked from the two different channels, e.g., pixel p1 belong to image channel 1 and p2 belong to image channel 2, while these 2 pixels are considered to be in the same coordinate systems (so that the distance and angles between them can be computed). These features may likewise be supplied to the classification module.

Texture Features Example (ii): Context-Texton Method

A "texton" is, for example, a set of one or more attributes of a pixel blob or a set of pixels lying less than a maximum distance apart from a reference pixel, whereby said attributes have been observed or are expected to be repetitive within an image. For example, a texton can be a frequently co-occurring combination of oriented linear filter outputs. The pixel blob can be, for example, a nuclear blob or a pixel area identified as lying within a cell comprising a nucleus. The reference pixel can be, for example, a nuclear center or cell center or cell membrane. Thus, a "texton" may be considered as a "visual word", e.g. an ellipse of a particular size or dimension, a circle of a particular average intensity value, a pixel blob having a particular intensity distribution or pattern, or the like.

The context-texton method computes a histogram of a texton map from an image patch centered at each NoI. (Malik, Jitendra et al., "Textons, Contours and Regions: Cue Integration in Image Segmentation." s.i.: IEEE Computer Society, 1999, Proceedings of the International Conference on Computer Vision, Corfu, Greece, which is hereby incorporated by reference in its entirety). Procedures for deriving context-texton features are also described in a co-pending application published as WO/2016/075096, the disclosure of which is incorporated by reference herein in its entirety.

Like the context-texture method, the goal of this method is also to capture the textural pattern in a region around each NoI. However, instead of deriving contextual information metrics from textural features, a bank of maximum response filters is applied on the image of the tissue sample (or to a channel image thereof) to obtain a list of filter response images. (See Varma and Zisserman, "Classifying images of materials: Achieving viewpoint and illumination independence," in Computer Vision ECCV 2002, 2002, vol. 2352, pp. 255-2'71, which is hereby incorporated by reference in its entirety). Each filter response image is a digital image comprising one or more filter responses. A "filter response" may be a filter response as defined in [0018]. The filter response images derived from the training images and the filter responses contained therein are collected and clustered into a plurality of K clusters that are referred to as "textons" (step 331).

For example, each of the filter responses obtained by applying a plurality of maximum response filters on the image of the tissue sample may be a vector having some property values like diameter, intensity or the like. The clustering of said filter responses may provide a set of K clusters, whereby a cluster center is iteratively computed for each cluster as a vector of mean values of all filter responses belonging to said cluster. Each cluster center may thus be a "mean" filter response vector (whose values are mean values of respective feature vectors of filter responses assigned to said cluster center) or other form of "prototype" filter response vector derived from the filter responses assigned to said cluster center. Said "derivative" filter response vector representing the cluster center of a cluster is used as a "texton." For example, each cluster center represents a set of projections of each filter onto a particular image patch. Said K "cluster center textons", which may be iteratively refined, can be provided as output of the K-means clustering algorithm. The criterion for the clustering algorithm is to find K "centers" such that after assigning each filter response vector to the nearest center, the sum of the squared distance from the centers is minimized. Thus, by processing the information contained in the tissue sample image, a texton vocabulary of K textons is automatically extracted. Then, a texton map may be computed from the textons constituting the cluster centers. Based on the plurality of trained cluster centers, each pixel of the image of the tissue sample is assigned into one of the K textons. For example, the assignment may be performed such that each pixel in the image (or at least each pixel in the image patch centered around the NoI), is assigned to the one of the textons which is characteristic for the filter output generated for a set of pixels comprising said pixel to be mapped. Since each pixel is mapped to exactly one of the textons, the image is partitioned into regions assigned to different textons. Said "partitioned image" may be referred to as the "texton map":

A texton histogram is then computed from all the pixels in an image patch having a size S×S centered at the NoI (step 333). In some embodiments, the patch size ranges from between about 50 pixels to about 200 pixels in any S×S dimension. In other embodiments, a patch size of about 150 pixels (about 70 microns) is used. It has been observed that said patch size ranges are particularly suited for accurately identifying cell types for which texture related context information is a predictive parameter. A "texton histogram feature" is, for example, a distribution of occurrence frequencies of textons ("visual words") identified in the image or in a particular image channel. For example, a texton histogram can be represented as a graph showing the number of textons of a particular type. For example, the following three types of textons may be extracted from an image: "ellypsoid1" having the axes a1.1 and a1.2, "ellypsoid2" having the axes a2.1 and a2.2, and "circle1" with diameter d1 and intensity value range=[09-110]. The texton histogram feature may be a histogram being indicative that texton "ellypsoid1" was found 79 times, texton "ellypsoid2" was found 1.124 times in the image and that "circle1" was found 34 times in the image.

Texture Features Example (iii): Context-CRF Method

The context-CRF method employs the conditional random field (CRF) model to enhance the homogeneity of a classification result. (see J. Lafferty et al., Conditional Random Fields: Probabilistic Models for Segmenting and Labeling Sequence Data. ICML, pp. 282-289, 2001, the disclosure of which is incorporated herein by reference in its entirety). The CRF model, like the BoW model herein, utilizes the pre-computed nuclear features/metrics and labels from the neighboring nuclei as contextual information, thereby allowing the incorporation of contextual information with no additional feature extraction (as compared with the context texture method and the context texton method). It is believed that the CRF model provides a natural way to incorporate pair-wise constraints, enforcing adjacent regions belonging to the same class. The context-CRF method is also described in a co-pending application published as WO/2016/075096, the disclosure of which is incorporated by reference herein in its entirety.

Texture Features Example (iv): Context-BoW Method

The bag-of-words model is a simple yet powerful representation technique based on frequency of basic blocks (words). Bag-of-words (BoW), a widely-used feature encoding method, assumes that the local features extracted from images are independent of each other, and only counts the frequency of each visual "word" appearing in each image. As used herein, the "word" is a nuclear feature vector. This method uses the observation that the contextual information of a NOI can be described via the appearance (e.g. number and/or cell type distribution) of its neighbors. In some embodiments, neighbors are defined as nuclei within a distance d=75 pixels. In other embodiments, the distance ranges from between about 25 pixels to about 100 pixels. The context-BoW method is also described in a co-pending application published as WO/2016/075096, the disclosure of which is incorporated by reference herein in its entirety.

(G) Spatial Features

Figure 7:
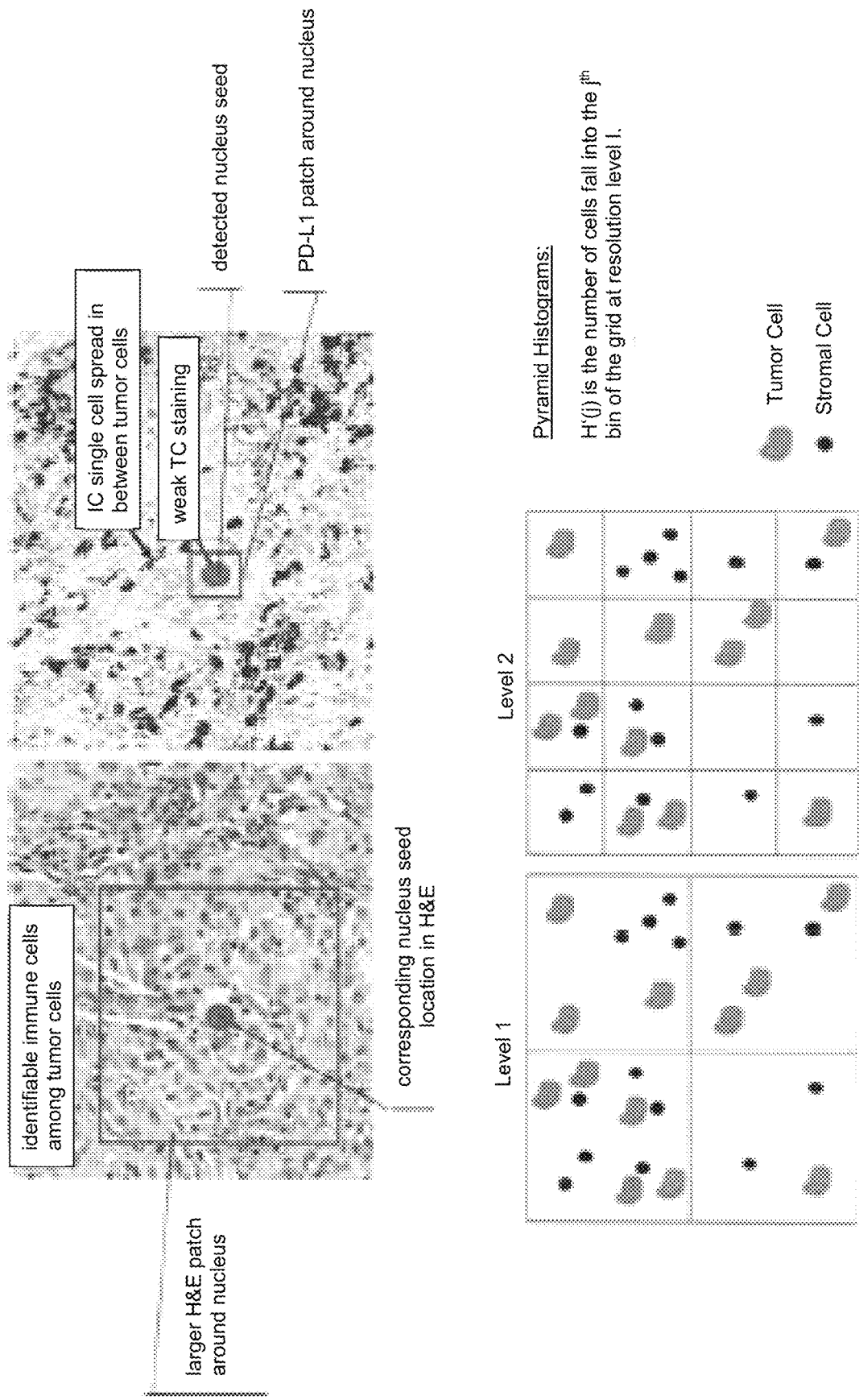
FIG. 7 illustrates that for each nucleus detected in an IHC slide, a corresponding nucleus seed location in an H&E image is identified and subsequently a larger H&E patch around the nucleus is obtained. Next, stromal and tumor cell distributions within the patch are estimated, where the distributions may be computed using a pyramid histogram.

In some embodiments, spatial features include a local density of cells; average distance between two adjacent detected cells; and/or distance from a cell to a segmented region (H) Pyramid Histogram Features In some embodiments, for each nucleus detected in a biomarker slide, a corresponding nucleus seed location is first identified in the corresponding H&E image and a larger H&E patch around the nucleus obtain. The stromal and tumor cell distributions with are then estimated in the patch. The distributions can be computed using a pyramid histogram (see, e.g. FIG. 7). Pyramid histogram features are further described by S. Lazebnik et al. "Beyond Bags of Features: Spatial Pyramid Matching for Recognizing Natural Scene Categories," VPR '06 Proceedings of the 2006 IEEE Computer Society Conference on Computer Vision and Pattern Recognition—Volume 2, Pages 2169-2178, June 17-22, 2006.

(I) Other H&E Image Features

For a detected nucleus center and associated blob (in IHC image), the H&E features can be computed from the mapped center and region in the H&E image and/or the H&E probability images. Some examples of the image features that can be used are:

(a) Average/Median/Variancespatial correlations/texture features/local statistics of image intensities in a local image window (e.g. a 15×15 image rectangular patch and/or multiple windows) around the mapped center H&E image;

(b) Histogram of the pixel intensities; and (c) Average/Maximum/Minimum values of the probabilities computed from probability map images.

(J) Metrics Derived from Nuclear Features

The skilled artisan will also appreciate that metrics may also be derived from nuclear features. The computation of such nuclear features is described by Xing et al. "Robust Nucleus/Cell Detection and Segmentation in Digital Pathology and Microscopy Images: A Comprehensive Review," IEEE Rev Biomed Eng 9, 234-263, January 2016, the disclosure of which is hereby incorporated by reference herein in its entirety.

Of course, other features, as known to those of ordinary skill in the art, may be considered and used as the basis for computation of features. The derived metrics are provided to the classification module 216 as a vector of features or metrics.

Derivation of Probability Features

The derivation of probability features first requires identifying either different tissues and/or cell types within the H&E image; followed by generating a probability map based on either the differently identified tissues and/or cell types; and then deriving probability features from the probability map.

Identification of Different Tissues and/or Cell Types

Given a H&E whole slide image different tissue types and/or cell types may be identified in the H&E image (collectively referred to herein as "segmentation" or "H&E image segmentation"). In some embodiments, the H&E image is segmented into different types of regions, including tumor regions, lymphatic regions, stromal regions, and necrotic regions. In other embodiments, cells within the H&E image are detected and classified as being tumor, lymphocytes or stromal cells. Following "segmentation" of the H&E image, a probability map is generated based on the identified tissue types and/or cell types.

In some embodiments, different image channels present in any of the input images (e.g. multiplex images comprising multiple signals corresponding to different biomarkers) must first be separated such as by color deconvolution (also referred to as "unmixing") to decompose the original RGB image into separate image channels. In some embodiments, an unmixing module is utilized to separate the individual color channels and is based on the method described in Ruifrok, A. and Johnston, D., "Quantification of histochemical staining by color de-convolution," Analyt. Quant. Cytol. Histol. 23, 291-299 (2001). In some embodiments, the multiplex images are unmixed using liner unmixing. Linear unmixing is described, for example, in 'Zimmermann "Spectral Imaging and Linear Unmixing in Light Microscopy" Adv Biochem Engin/Biotechnol (2005) 95:245-265' and in in C. L. Lawson and R. J. Hanson, "Solving least squares Problems", PrenticeHall, 1974, Chapter 23, p. 161," the disclosures of which are incorporated herein by reference in their entirety. In other embodiments, in some types of image analysis, cell detection and classification can be done directly on the input RGB image or some other derived images (like HSV, CIELab) from the RGB image. In other embodiments, unmixing is accomplished using the methods described in WO2015/124772, entitled "Group Sparsity Model for Image Unmixing," filed on Feb. 23, 215, the disclosure of which is hereby incorporated by reference in its entirety herein. In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric.

In some embodiments, the H&E image is unmixed into separate channels representing the local amounts of Hematoxylin, the local amount of Eosin. In addition, a luminance channel (the L component of the Lab color space) may be generated by the unmixing module for the H&E image. Without wishing to be bound by any particular theory, it is believed that these channels highlight different tissue structures in the tissue image, thus, they may be referred to as structural image channels. More precisely, the Hematoxylin channel highlights nuclei regions, the eosin channel highlights eosinophilic structures, while the luminance channel highlights fatty structures, lumen and spaces. Therefore, features extracted from these channels are useful in describing the different biological structures present within any image of a tissue. Of course, the skilled artisan will recognize that the selection of structural image channels can be adjusted for each segmentation problem. For example, in IHC stained images, structural image channels can include the counterstain channel, one or more immunohistochemistry-stained channels, hue, and luminance, where each channel facilitates identification of different tissues and/or structures within the IHC image.

In some embodiments, H&E image segmentation and tissue type identification is performed according to the methods described in PCT/EP2015/051302, filed Jan. 23, 2015 and entitled "Adaptive Classification for Whole Slide Tissue Segmentation" (published as WO2015/113895), the disclosure of which is hereby incorporated herein by reference in its entirety. In general, WO2015/113895 describes segmenting tumor regions from other regions in an image via operations related to classification of the regions that include identifying grid points in the tissue image, classifying the grid points as one of a plurality of tissue types, and generating classified grid points based on a database of known characteristics of tissue types, assigning the classified grid points at least one of a high confidence score and a low confidence score, modifying a database of known characteristics of tissue types based on the grid points that were assigned a high confidence score, and generating a modified database, and reclassifying the grid points that were assigned a low confidence score based on the modified database, to segment the tissue (e.g., identify tissue regions in an image).

In some embodiments, different types of cells are detected in the H&E images using a radial symmetry based cell detection method; followed by the computation of multiple image features (morphometric, intensity); and subsequent training a supervised classifier to categorize cells into different cell types.

In some embodiments, H&E image segmentation is performed according to the methods described by Veta et al. "Automatic Nuclei Segmentation in H&E Stained Breast Cancer Histopathology Images," PLoS One. 2013; 8(7): e70221, the disclosure of which is incorporated herein by reference in its entirety. According to this method, and in general, image segmentation can be divided into four main steps: 1) pre-processing, 2) marker-controlled watershed segmentation, 3) post-processing, and 4) merging of the results from multiple scales. The aim of the pre-processing is to remove irrelevant content while preserving the boundaries of the nuclei. The pre-processing starts with color unmixing for separation of the hematoxylin stain from the RGB image. The grayscale version of the hematoxylin image is then processed with a series of morphological operations in order to remove irrelevant structures. The core part of the procedure is the marker-controlled watershed segmentation. Two types of nuclear markers are used: markers extracted using an image transform that highlights structures of high radial symmetry regional minima of the pre-processed image. In the post-processing step, regions unlikely to represent nuclei are removed and the contours of the remaining regions are parameterized as ellipses. By varying the size of the structuring element in the pre-processing step, the segmentation procedure can be tuned to look for nuclei at different scales, allowing multiscale analysis. The segmentation results from the multiple scales and two marker types are then merged by resolving concurrent regions to give the final segmentation.

In other embodiments, H&E segmentation is performed according to the methods described by Gurcan et al. "Histopathological Image Analysis: A Review," IEEE Rev Biomed Eng. 2009; 2: 147-171, the disclosure of which is incorporated herein by reference in its entirety. There, the authors describe various local, structural segmentation techniques, and global scene segmentation approaches, any of which may be used in conjunction with the workflow presented herein.

In yet other embodiments, H&E segmentation is performed according to the methods described by Bautista et al. "Improving the visualization and detection of tissue folds in whole slide images through color enhancement," J Pathol Inform 2010, 1:25, the disclosure of which is incorporated herein by reference in its entirety.

In other embodiments, segmentation may be accomplished using thresholding techniques known to those of ordinary skill in the art. Other methods of segmentation include a multi-scale approach, such as described in Kriete, A et al., Automated quantification of quantum-dot-labeled epidermal growth factor receptor internalization via multi-scale image segmentation, Journal of Microscopy, v. 222(1) 22-27 (April 2006); an active contour (snake) approach, described in Kass, A. Witkin, and D. Terzopoulos. Snakes: Active contour models. International, Journal of Computer Vision, 1:321-332, 1988; a level set approach, described in J. A. Sethian, Level Set Methods: Evolving Interfaces in Geometry, Fluid Mechanics, Computer Vision and Materials Sciences. Cambridge Univ. Press, 1996; a contour closure approach described in Mahamud, S et al., Segmentation of Multiple Salient Closed Contours from Real Images, IEEE Transactions On Pattern Analysis And Machine Intelligence, Vol. 25, No. 4, April 2003, and a Watershed approach described in Vincent, L. et al., Watersheds in digital spaces: An efficient algorithm based on immersion simulations, IEEE Transactions on Pattern Analysis and Machine Intelligence v. 13(6) June 1991 pp. 583-598, see also the review article on Watershed: Roerdink, J. and Meijster A., The Watershed Transform: Definitions, Algorithms and Parallelization Strategies", Fundamenta Informatica v. 41, 2001, IOS Press pp. 187-228. Other techniques can be used, including those disclosed in the following papers: Thouis R. Jones et al., Voronoi-Based Segmentation of Cells on Image Manifolds, in CVBIA, ser. Lecture Notes in Computer Science, Y. Liu et al. Eds., vol. 3765 Springer-Verlag, 2005 pp. 535-543; the poster paper of Thouis R. Jones et al., Methods for High-Content, High-Throughput Image-Based Cell Screening, Proceedings of MIAAB 2006 available on-line at vvww.broad.mitedu/~thouis/MIAABPoster.pdf; and Gang Lin et al., A Hybrid 3D Watershed Algorithm Incorporating Gradient Cues and Object Models for Automatic Segmentation of Nuclei in Confocal Image Stacks, Cytometry Part A, 56A:23-26 (2003).

Probability Map Generation

Following H&E image segmentation, a probability map is generated and may be based only on the identified tissue types, only on the identified cell types, or both the identified tissue types and identified cell types. In some embodiments, the probability map is a vector of images, same-sized as the number of categorized classes. At each pixel location in the probability map a vector of class probabilities (vector size is equal to the number of regions) is generated. The class probability for a class gives the probability of a pixel belonging to that particular class. In an example of region classification result, the classes can be (tumor, non-tumor, lymphatic, stromal, necrotic region). In an example of a cell classification result, the classes can be background and different types of cellular structures (tumor, lymphocytes, stromal cells, connected tissue, background etc.).

Figure 6A:
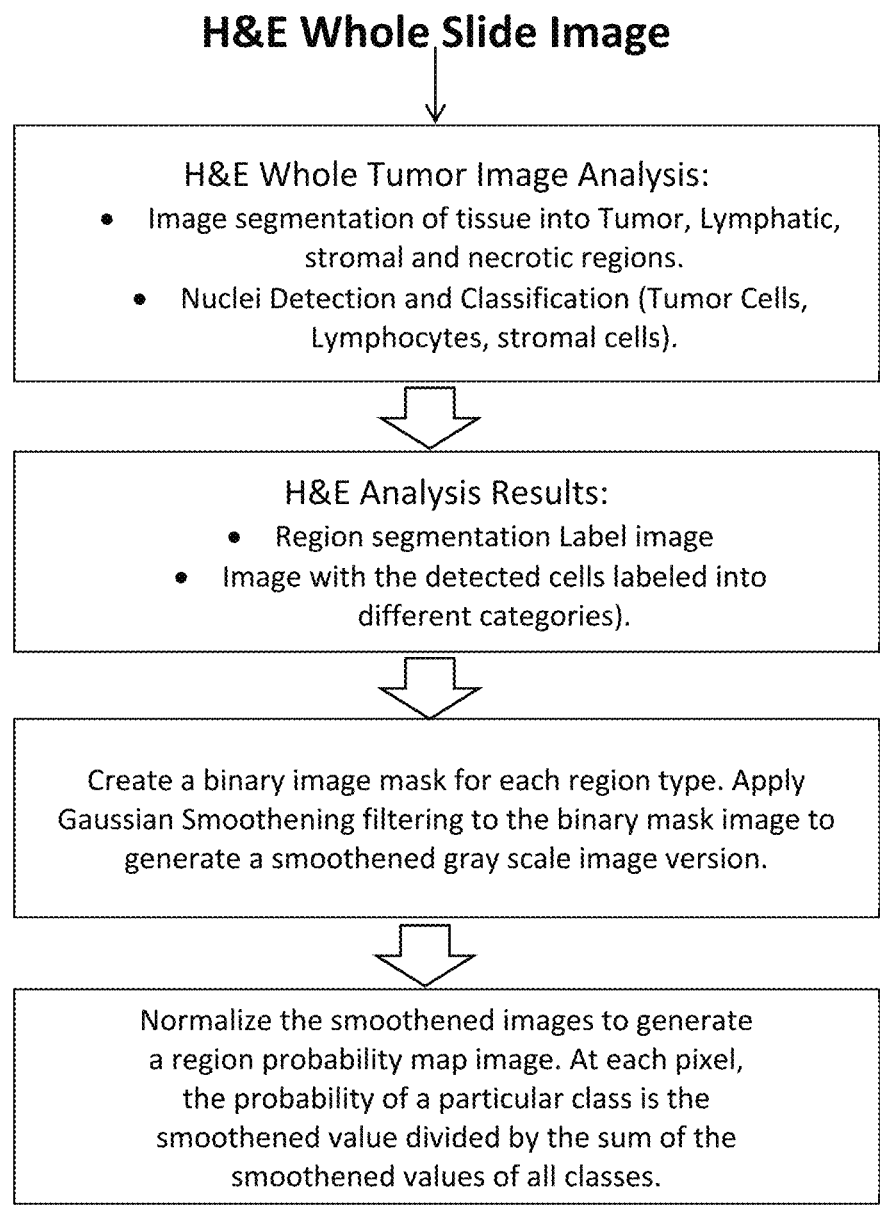
FIGS. 6A and 6B set forth flow charts illustrating the steps of generation probability maps, in accordance with some embodiments.
Figure 6B:
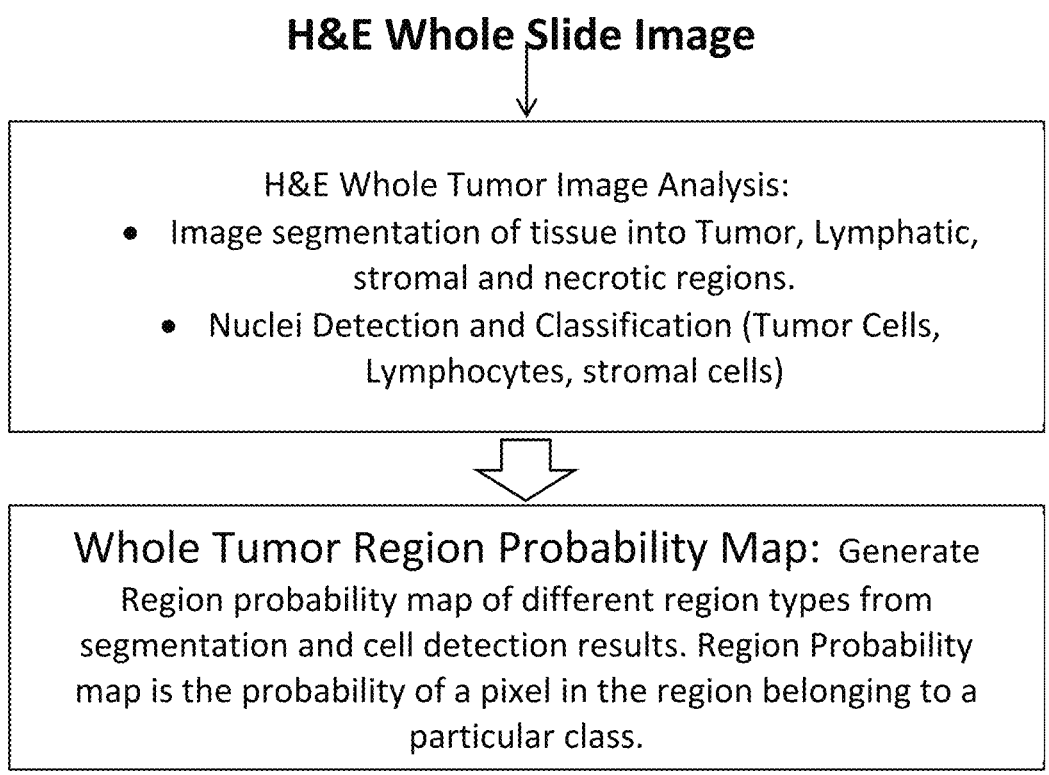

The probability map results can be generated in two different ways, as set forth in FIGS. 6A and 6B. In one embodiment, and as a byproduct of the application of the image analysis algorithm, a probability map will also be generated (see FIG. 6B). Indeed, for each annotated and analyzed sub-image region, a probability map image vector is provided as output.

In another embodiment, such as set forth in FIG. 6A, a probability map image vector is computed from the image analysis result image. The image analysis result image is assumed to be an image where each pixel is assigned a classification label and from which multiple binary image masks, one for each region type, are generated. Subsequently, a smoothening filter (11×11 Gaussian filter for example) is applied to the image to generate a smoothened version. From the multiple generated smoothened images (each for a different region type), a probability image vector is generated by normalizing at each pixel. (i.e. at any given pixel, pixel value in a specific probability image is given as the smoothened Gaussian value normalized by the sum of the smoothened values from all the region types).

Probability Features

In some embodiments, the features extracted from the H&E probability map images may be used as an additional image features to analyze the IHC image slide (e.g. an H&E image corresponds to a deformed version of the tissue section with respect to the adjacent serial tissue section of the IHC image, so a pixel-to-pixel or even cell-to-cell correspondence of the IHC and H&E image is not possible).

In some embodiments, the generated region map has a tensor representation, where each pixel in the region map corresponds to a k-dimensional vector indicating the probability that the pixel belongs to a particular region (e.g. a tissue region).

Classification

After H&E image features, biomarker image features, and probability image features are derived, they are merged together and used to classifying nuclei within at least one of the input images. In some embodiments, the classifier is trained and then used to distinguish different cell nuclei or staining responses. In some embodiments, during training, example cells are presented together with a ground truth identification provided by an expert observer according to procedures known to those of ordinary skill in the art.

Theoretical and empirical results alike have established that, in terms of accuracy, ensembles of classifiers generally outperform monolithic solutions. Learning ensembles or multiple classifier systems (Support Vector Machine or Adaboost, described below) are methods for improving classification accuracy through aggregation of several similar classifiers' predictions and thereby reducing either the bias or variance of the individual classifiers.

In some embodiments, the classification module is a Support Vector Machine ("SVM"). In general, a SVM is a classification technique, which is based on statistical learning theory where a nonlinear input data set is converted into a high dimensional linear feature space via kernels for the non-linear case. Without wishing to be bound by any particular theory, it is believed that support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data are classified on the basis of where they fall with respect to the hyperplane. The kernel function K defines the method in which data are projected into the high-dimensional space.

In other embodiments, classification is performed using an AdaBoost algorithm. The AdaBoost is an adaptive algorithm which combines a number of weak classifiers to generate a strong classifier. Image pixels identified by a pathologist during the training stage (e.g. those having a particular stain or belonging to a particular tissue type) are used to generate probability density functions for each of the individual texture features $\Phi_j$, for $j \square \{1, \ldots, K\}$ which are considered as weak classifiers. Bayes Theorem is then used to generate likelihood scenes $L_j=(C_j, Ij \square \{1, \ldots, K\})$ for each $\Phi_j$ which constitute the weak learners. These are combined by the AdaBoost algorithm into a strong classifier $\Pi_j = \Sigma T_i = 1\alpha_{ji} l_{ji}$ where for every pixel $c^i \square C^i$, $\Pi^i(c^i)$ is the combined likelihood that pixel $c^i$ belongs to class $\omega_T$, where $\alpha_{ji}$ is the weight determined during training for feature $\phi_i$, and T is the number of iterations.

In other embodiments, classification is performed using a Bootstrap aggregating technique. Bootstrap aggregating (bagging) is a machine learning ensemble meta-algorithm, designed to improve the stability and accuracy of machine learning used in statistical classification and regression. It also reduces variance and helps to avoid overfitting.

EXAMPLES

| PLDI Scoring | | |
| --- | --- | --- |
| | PD-L1 Score | PD-L1 Status |
| Tumor Cell (TC) Staining Assessment | | |
| Absence of any discernible PD-LI staining OR Presence of discernible membrane staining of any intensity in < 50% of tumor cells | TC 0/1/2 | Negative |
| Presence of discernible membrane staining of any intensity in > 50% of tumor cells | TC 3 | Negative |

-continued

| PLDI Scoring | | |
| --- | --- | --- |
| | PD-L1 Score | PD-L1 Status |
| Reflex: Immune Cell (IC) Staining Assessment | | |
| Absence of any discernible PD-LI staining OR Presence of discernible PD-LI staining of any intensity in tumor infiltrating immune cells covering < 10% of tumor area occupied by tumor cells, associated intratumoral, and contiguous peri-tumoral desmoplastic stroma | IC 0/1/2 | Negative |
| Presence of discernible PD-LI staining of any intensity in tumor infiltrating immune cells covering > 10% of tumor area occupied by tumor cells, associated intratumoral, and contiguous peri-tumoral desmoplastic stroma | IC 3 | Positive |

TABLE 1

| Description of IHC Scoring Algorithm | IHC Score |
| --- | --- |
| Absence of any discernible VENTANA anti-PD-L1 (SP142) staining OR Presence of discernible VENTANA anti-PD-L1 (SP142) staining of any intensity in tumor infiltrating immune cells covering < 1% of tumor area occupied by tumor cells, associated intratumoral, and contiguous peri-tumoral desmoplastic stroma | IHC 0 |
| Presence of discernible VENTANA anti-PD-L1 (SP142) staining of any intensity in tumor infiltrating immune cells covering between ≥ 1% to < 5% of tumor area occupied by tumor cells, associated with intratumoral, and contiguous peri-tumoral desmoplastic stroma | IHC 1 |
| Presence of discernible VENTANA anti-PD-L1 (SP142) staining of any intensity in tumor infiltrating immune cells covering between ≥ 5% of tumor area occupied by tumor cells, associated intratumoral, and contiguous peri-tumoral desmoplastic stroma | IHC 2 |

Workflow Example 1

1. Whole slide scanning of H&E and IHC tissue slides. (ER, PR, Ki67 and HER2 etc.)
2. Pathologist reviews IHC tissue whole slide (ex: Ki67) on a whole slide viewer (Virtuoso, Verso, IRIS etc.).
3. Pathologist annotates and picks representative regions from IHC tissue slides for image analysis.
4. Use Inter-marker registration algorithm to map back the annotated regions from IHC tissue whole slide to H&E tissue whole slide.
5. Automated image analysis of the mapped regions in H&E whole slide to detect the tissue structures of interest, e.g. tumor cells, lymphocytes, stromal cells and regions.
6. From the analyzed region in the H&E image, compute a regional probability heat map of different tissue/cellular types (i.e. a probability of lymphocytes, probability of tumor cells etc.). The probability map is computed from the detections on H&E image using image smoothening.
7. Use the H&E analysis information in IHC image (I<i67)—add the cell/probability map of various cell types as supplementary features to the feature set computed from the Ki67 image on the detected nuclei objects in the IHC tissue—and use for nuclei object classification in IHC image. Here the assumption is that, given that it is easy to differentiate image features for some of the cellular objects (like counter-stained tumor nuclei, lymphocytes and stromal cells) in H&E image, they will contribute to improve the robustness of the nuclei object classifier by reducing false positives by aiding in the detection of negatively and positively stained tumor nuclei.

Workflow Example 2

As another workflow example, a computer based PD-L1 scoring algorithm that combines both H&E and IHC information is presented. Serial sectional H&E and IHC slides can be used as input. Image registration algorithm can be used to align the two images. Image segmentation can then be performed on both images to obtain different regions such as tumor, stromal, necrotic and vascular regions. Next, segmentation results can be combined from both slides to generate a region map. The region map can be obtained by a plurality of methods such as morphological operations, or weighted average of the probabilities from the segmentation results. In that case, both H&E and IHC slides can be used to help each other in the segmentation. Next, the nucleus detection method can be used to obtain seeds in both H&E and IHC slides. A plurality of features can be extracted around the seeds including but not limited to the following:
1. PD-L 1 feature: color, intensity, gradient, bags of words, etc. from the IHC slides;
2. H&E feature: color, intensity, gradient, bags of words, etc. from the H&E slides, stromal and tumor cell distributions in a larger patch. More details on the cell distribution are described below;
3. Region map feature: features related to a k-dimensional vector representation that indicates the probability that the pixel belongs to a region;

Then, classification algorithms such as Adaboost, SVM, Random Forest, KNN, Bagging, Boosting tree etc. can be used to classify the feature vectors. Instead of classifying over all the features, ensemble learning can be used at this step. Weak learners can be chosen from simple bootstrapping to complex classification algorithms such as listed above.

Other Components for Practicing Embodiments of the Present Disclosure

The computer system of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan HT brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities. In other embodiments, the imaging apparatus includes a digital camera coupled to a microscope.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims. The foregoing written specification is considered to be sufficient to enable one skilled in the art to practice the disclosure. Various publications are cited herein, the disclosures of which are incorporated by reference in their entireties.

The invention claimed is:

1. A method comprising:
receiving a first image and a second image, wherein the first image is a biomarker image and the second image is an H&E image;
registering at least a portion of the first image to the second image to form a registered image;
for the first image:
  detecting a set of nuclei; and
  computing, for a nucleus of the set of nuclei in the first image, one or more biomarker features of the nucleus;
for the registered image:
  mapping one or more annotations of an image region the first image to a corresponding image region of the registered image to generate a mapped region of the registered image; and
  identifying, for the mapped region, one or more H&E features based at least in part on the one or more annotations, wherein identifying the one or more H&E features of the mapped region includes classifying a set of cells detected from the mapped region, and wherein classifying the set of cells includes:
    generating a region probability map corresponding to the mapped region; and
    identifying, based on the region probability map, a probability that one or more pixels that represent a cell of the set of cells correspond to a particular cell type;
merging the one or more biomarker features of the nucleus detected from the first image and the one or more H&E features of the mapped region to generate one or more merged features corresponding to the nucleus of the first image; and classifying the nucleus of the first image based on the one or more merged features.

2. The method of claim 1, wherein the particular cell type includes a tumor cell, a lymphocyte, or a stromal cell.

3. The method of claim 1, wherein classifying the nucleus of the first image includes applying a machine-learning model to feature vectors derived from the one or more merged features.

4. The method of claim 1, wherein the one or more merged features include at least one of a morphology feature, a texture feature, spatial feature, or a histogram feature.

5. The method of claim 1, wherein the first image depicts a tissue section of a biological sample and the second image depicts another tissue section of the biological sample, wherein the other tissue section is located adjacent to the tissue section.

6. A system comprising:
one or more data processors; and
a non-transitory computer readable storage medium containing instructions which, when executed on the one or more data processors, cause the one or more data processors to perform operations comprising:
receiving a first image and a second image, wherein the first image is a biomarker image and the second image is an H&E image;
registering at least a portion of the first image to the second image to form a registered image;
for the first image:
detecting a set of nuclei; and
computing, for a nucleus of the set of nuclei in the first image, one or more biomarker features of the nucleus;
for the registered image:
mapping one or more annotations of an image region the first image to a corresponding image region of the registered image to generate a mapped region of the registered image; and
identifying, for the mapped region, one or more H&E features based at least in part on the one or more annotations, wherein identifying the one or more H&E features of the mapped region includes classifying a set of cells detected from the mapped region, and wherein classifying the set of cells includes:
generating a region probability map corresponding to the mapped region; and
identifying, based on the region probability map, a probability that one or more pixels that represent a cell of the set of cells correspond to a particular cell type;
merging the one or more biomarker features of the nucleus detected from the first image and the one or more H&E features of the mapped region to generate one or more merged features corresponding to the nucleus of the first image; and
classifying the nucleus of the first image based on the one or more merged features.

7. The system of claim 6, wherein the particular cell type includes a tumor cell, a lymphocyte, or a stromal cell.

8. The system of claim 6, wherein classifying the nucleus of the first image includes applying a machine-learning model to feature vectors derived from the one or more merged features.

9. The system of claim 6, wherein the one or more merged features include at least one of a morphology feature, a texture feature, spatial feature, or a histogram feature.

10. The system of claim 6, wherein the first image depicts a tissue section of a biological sample and the second image depicts another tissue section of the biological sample, wherein the other tissue section is located adjacent to the tissue section.

11. A computer-program product tangibly embodied in a non-transitory machine-readable storage medium, including instructions configured to cause one or more data processors to perform operations comprising:
receiving a first image and a second image, wherein the first image is a biomarker image and the second image is an H&E image;
registering at least a portion of the first image to the second image to form a registered image;
for the first image:
detecting a set of nuclei; and
computing, for a nucleus of the set of nuclei in the first image, one or more biomarker features of the nucleus;
for the registered image:
mapping one or more annotations of an image region the first image to a corresponding image region of the registered image to generate a mapped region of the registered image; and
identifying, for the mapped region, one or more H&E features based at least in part on the one or more annotations, wherein identifying the one or more H&E features of the mapped region includes classifying a set of cells detected from the mapped region, and wherein classifying the set of cells includes:
generating a region probability map corresponding to the mapped region; and
identifying, based on the region probability map, a probability that one or more pixels that represent a cell of the set of cells correspond to a particular cell type;
merging the one or more biomarker features of the nucleus detected from the first image and the one or more H&E features of the mapped region to generate one or more merged features corresponding to the nucleus of the first image; and
classifying the nucleus of the first image based on the one or more merged features.

12. The computer-program product of claim 11, wherein classifying the nucleus of the first image includes applying a machine-learning model to feature vectors derived from the one or more merged features.

13. The computer-program product of claim 11, wherein the one or more merged features include at least one of a morphology feature, a texture feature, spatial feature, or a histogram feature.

14. The computer-program product of claim 11, wherein the first image depicts a tissue section of a biological sample and the second image depicts another tissue section of the biological sample, wherein the other tissue section is located adjacent to the tissue section.

* * * * *